(12) United States Patent
Suwabe et al.

(10) Patent No.: US 7,656,576 B2
(45) Date of Patent: Feb. 2, 2010

(54) DISPLAY MEDIUM, DISPLAY DEVICE AND DISPLAY METHOD

(75) Inventors: Yasufumi Suwabe, Kanagawa (JP); Yoshinori Machida, Kanagawa (JP); Kiyoshi Shigehiro, Kanagawa (JP); Satoshi Tatsuura, Kanagawa (JP); Masaaki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 325 days.

(21) Appl. No.: 11/806,829

(22) Filed: Jun. 4, 2007

(65) Prior Publication Data
US 2008/0112040 A1    May 15, 2008

(30) Foreign Application Priority Data
Nov. 10, 2006  (JP) .............................. 2006-305162
Dec. 15, 2006  (JP) .............................. 2006-339017

(51) Int. Cl.
*G02B 26/00*  (2006.01)
(52) U.S. Cl. ..................... 359/296; 345/107
(58) Field of Classification Search ................. 359/296; 345/107
See application file for complete search history.

(56) References Cited

U.S. PATENT DOCUMENTS

2005/0007649 A1 * 1/2005 Kawai et al. ............... 359/296
2007/0047065 A1   3/2007 Toyoda

FOREIGN PATENT DOCUMENTS

| JP | A 7-325434  | 12/1995 |
| JP | A 2003-149690 | 5/2003 |
| JP | A 2003-186062 | 7/2003 |
| JP | A-2004-252170 | 9/2004 |
| JP | A 2005-326570 | 11/2005 |
| JP | A 2005-345573 | 12/2005 |
| JP | A-2006-091546 | 4/2006 |

* cited by examiner

*Primary Examiner*—Evelyn A. Lester
(74) *Attorney, Agent, or Firm*—Oliff & Berridge, PLC

(57) ABSTRACT

A display medium includes at least: a pair of substrates, at least one of the substrates having optical transparency; a dispersion medium positioned in a gap between the pair of substrates; one or more kinds of electrophoretic particles or two or more kinds of electrophoretic particles different in color from each other, included in the dispersion medium; and a holder disposed between the pair of substrates, the holder having a function of holding the electrophoretic particles and a function of controlling, by an external voltage, a movement amount of the electrophoretic particles on the holder.

39 Claims, 11 Drawing Sheets

DISPLAY MEDIUM, DISPLAY DEVICE AND DISPLAY METHOD

CROSS-REFERENCE TO RELATED APPLICATIONS

This application is based on and claims priority under 35 USC 119 from Japanese Patent Applications No. 2006-305162 filed Nov. 10, 2006 and No. 2006-339017 filed Dec. 15, 2006.

BACKGROUND

1. Technical Field

The invention relates to a display medium, a display device and a display method.

2. Related Art

As an environmentally conscious display medium, a display medium has been known which displays by using an electrophoresis phenomenon caused when charged particles are placed in an electric field. The display medium has a memory property by which even in a state where an electric field is not applied a displayed image can be maintained without disappearance; accordingly, there is an advantage in that the power consumption is small. Furthermore, in order to make use of this advantage, it is important that a display medium is formed into a reflective type to enable a particularly clear display.

As a display medium that enables a clear display, for example, a display medium has been known which has a configuration where between a pair of substrates shielding spherical bodies that can shield light traveling from one substrate side toward the other substrate side or traveling in the inverse direction are disposed and display particles can pass through gaps of the spherical bodies. In the display medium, by differentiating optical properties between the spherical bodies and the display particles, a clear display is obtained.

SUMMARY

According to an aspect of the invention, there is provided a display medium, including at least: a pair of substrates, at least one of the substrates having optical transparency; a dispersion medium positioned in a gap between the pair of substrates; one or more kinds of electrophoretic particles or two or more kinds of electrophoretic particles different in color from each other, included in the dispersion medium; and a holder disposed between the pair of substrates, the holder having a function of holding the electrophoretic particles and a function of controlling, by an external voltage, a movement amount of the electrophoretic particles on the holder.

BRIEF DESCRIPTION OF THE DRAWINGS

Exemplary embodiments of the present invention will be described in detail based on the following figures, wherein.

DETAILED DESCRIPTION

-Display Method-

Figure 1A:
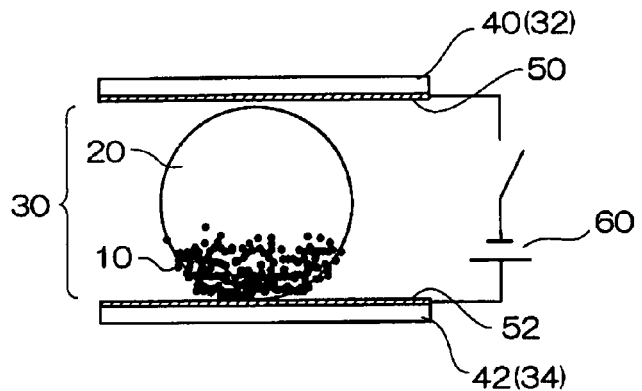
FIGS. 1A and 1B are schematic diagrams for explaining a display principle of a display method of an exemplary embodiment.

The display method in the exemplary embodiment is a display method of switching a display by carrying out the following processes in any order, the method including:

applying an electric field to a light-modulating layer that includes a dispersion medium, one or more kinds of electrophoretic particles or two or more kinds of electrophoretic particles different in color from each other, included in the dispersion medium, and a holder having a function of holding the electrophoretic particles (hereinafter referred to as an "electrophoretic particle holder"), the electric field forming a potential gradient and moving the electrophoretic particles via the electrophoretic particle holder, to localize the electrophoretic particles at one side of the light-modulating layer, thereby displaying a color due to the electrophoretic particles at the one side of the light-modulating layer at a maximum density;

applying an electric field to the light-modulating layer, the electric field forming a potential gradient and moving the electrophoretic particles via the electrophoretic particle holder, to localize the electrophoretic particles at the other side of the light-modulating layer, thereby displaying a color due to the electrophoretic particles at the one side of the light-modulating layer at a minimum density; and applying an electric field to the light-modulating layer, the electric field forming a potential gradient and moving the electrophoretic particles via the electrophoretic particle holder, to localize the electrophoretic particles between the one side and the other side of the light-modulating layer, thereby displaying a color due to the electrophoretic particles at the one side of the light-modulating layer at a density smaller than the maximum density but larger than the minimum density.

Now, the electrophoretic particles and electrophoretic particle holder, which are used in the exemplary embodiment, form an electric double layer in a dispersion medium, and there is a case where one of these is positively charged and the other is negatively charged or a case where only the electrophoretic particles are charged. Furthermore, as the electrophoretic particles and electrophoretic particle holder used in the invention, those of which charging voltages are designed so as to satisfy the following characteristics may be used.

That is, when the electrophoretic particles are located on a surface of an electrophoretic particle holder or in the neighborhood thereof, by using a force working between bodies (mainly an electrostatic force) or a steric hindrance due to a structure of the electrophoretic particle holder, the electrophoretic particles are held on a surface of the electrophoretic particle holder. However, when the electrophoretic particle holder on a surface of which the electrophoretic particles are held is placed in an electric field equal to or higher than a predetermined electric field strength, the electrophoretic particles overcome an electrostatic adsorption force or the steric hindrance and thereby can escape from a state of being held on a surface of the electrophoretic particle holder and move.

In order to control the adherence between the electrophoretic particles and the electrophoretic particle holder (that is, a holding function), as a force that works between bodies, other than the electrostatic force, a magnetic force or an intermolecular force may be used.

The holding of the electrophoretic particles by using the steric hindrance means a state where, though depending on a configuration of the electrophoretic particle holder (which will be detailed later), owing to members such as fibers or particles that constitute the electrophoretic particle holder, the electrophoretic particles are inhibited from moving on a surface of the electrophoretic particle holder.

Here, "a surface of an electrophoretic particle holder" means a region of an electrophoretic particle holder abutting on a boundary between the electrophoretic particle holder and the outside of the electrophoretic particle holder, and means an outer circumferential surface of the electrophoretic particle holder and, when the electrophoretic particle holder has pores, inner circumferential surfaces of the pores.

Furthermore, the "maximum density" means a state where, owing to an electric field, 95% or more, specifically 98% or more of one kind of the particles are localized at a display surface side and thereby a color of the particles can be seen from a display surface.

Specifically, the maximum density means a density when, while the color density at one side of a light-modulating layer is measured with a reflection densitometer (manufactured by X-rite Corp.,) as an optical density (OD), a voltage is applied between the one side and the other side of the light-modulating layer and gradually varied so as to increase the measurement density (by increasing or decreasing an applied voltage value), so that a density variation per unit voltage is saturated and, even when in this state a voltage and a voltage application time are further increased, the density is not varied and thus saturated.

Furthermore, the "minimum density" means a state where, owing to an electric field, 95% or more, specifically 98% or more of one kind of particles are localized at a side opposite to the display surface and thereby a color of the particles cannot be seen from a display surface.

Specifically, the minimum density means a density when, while the color density at one side of a light-modulating layer is measured with a reflection densitometer (manufactured by X-rite Corp.,) as an optical density (OD), a voltage is applied between the one side and the other side of the light-modulating layer and gradually varied so as to decrease the measurement density (by decreasing or increasing an applied voltage value), so that a density variation per unit voltage is saturated and, even when a voltage and a voltage application time are further increased at this state, the density is not varied and thus saturated.

The electrophoretic particle holder has a function of sticking and holding electrophoretic particles on a surface (at least on an outer circumferential surface or inner circumferential surface) thereof. The "holding" means that an sticking force works between the surface of the electrophoretic particle holder and the electrophoretic particles to an extent wherein the electrophoretic particles are not detached from the surface of the electrophoretic particle holder due to gravity. More specifically, the "holding" means that, in a display device using a display method of the exemplary embodiment, when, after an electric field is applied to a light-modulating layer to form an image, a state of stopping an electric field application to the light-modulating layer is continued, a variation in the reflectance 10 days after the image formation is within ±5% based on the reflectance at the formation of the image as a reference (100%).

Furthermore, the polarity and charging potential of the electrophoretic particles and the electrophoretic particle holder may be readily controlled by selecting main components included in these members and optional additives such as a charge control agent and a dispersant, so that the above-described characteristics may be obtained. Still further, the electrophoretic particle holder should not be electrophoresed when an electric field is applied to a light-modulating layer. For example, an electrophoretic particle holder can be fixed at a predetermined position in a light-modulating layer so as not to be moved, or can be constituted with a member having a weight so as not to be moved even when an electric field is applied. The electrophoretic particles and the electrophoretic particle holder will be detailed later.

Accordingly, in the case where an electric field is applied to the light-modulating layer, when the electric field has an electric field strength that is capable of detaching the electrophoretic particles held on a surface of the electrophoretic particle holder from the surface of the electrophoretic particle holder to move in a dispersion medium, the electrophoretic particles can move along a direction of a potential gradient in the light-modulating layer.

On the other hand, when an electric field applied to the light-modulating layer has an electric field strength that can not detach the electrophoretic particles held on a surface of the electrophoretic particle holder from the surface of the electrophoretic particle holder or when an electric field is not applied to the light-modulating layer, the electrophoretic particles continue to be in a state of being held on a surface of the electrophoretic particle holder. Accordingly, when a display method of the exemplary embodiment is utilized, an excellent sustainability of a display state can be obtained.

Furthermore, by selecting a strength of an applied electric field or a time period during which an electric field is applied, not only the maximum density and the minimum density can be displayed (first and second display processes) similarly to an conventional display medium, but also an arbitrary density between the maximum density and the minimum density, that is, a halftone can be displayed (a third display process) in each of the pixels.

Explanation of the "maximum density" and "minimum density", which is the same as the definitions described above, are omitted here.

In the next place, a display principle of a display method of the exemplary embodiment will be detailed with reference to the drawings. FIGS. 1A through 7B are schematic diagrams for describing a display principle of a display method of the exemplary embodiment and show a movement of electrophoretic particles present on a surface of one particulate electrophoretic particle holder and in the neighborhood thereof or sticking positions on a surface of the electrophoretic particle holder.

In the drawings, reference numerals 10, 20, 30, 32, 34, 40, 42, 50, 52 and 60, respectively, represent an electrophoretic particle, an electrophoretic particle holder, a light-modulating layer, one side of the light-modulating layer 30, the other side of the light-modulating layer 30, a transparent substrate (a substrate having optical transparency), a substrate, a transparent electrode, an electrode and an electric field applicator.

In embodiments shown in the drawings, it is assumed that the electrophoretic particles 10 are positively charged, the electrophoretic particle holder 20 is negatively charged, and an electric field applied on the light-modulating layer 30 by use of the electric field applicator 60 has an electric field strength capable of detaching the electrophoretic particles 10 electrostatically stuck to and held on a surface of the electrophoretic particle holder 20 from the surface of the electrophoretic particle holder 20 to move in a dispersion medium. Furthermore, the electrophoretic particle holder 20 is fixed in the light-modulating layer 30 so as not to move even when an electric field is applied, and colored in a color different from that of the electrophoretic particles 10.

Figure 1B:
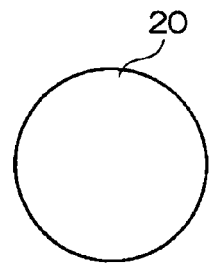
Figure 2:
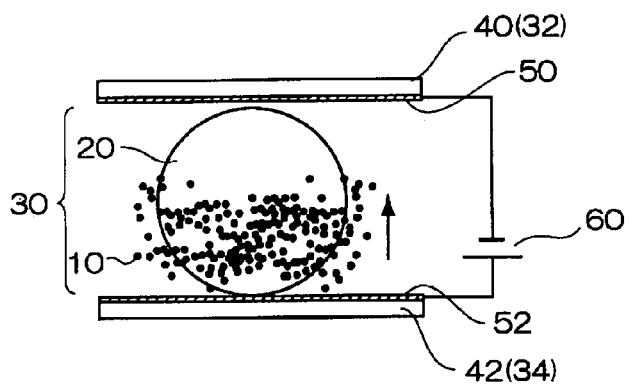
FIG. 2 is a schematic diagram for explaining a display principle of a display method of an exemplary embodiment.
Figure 3A:
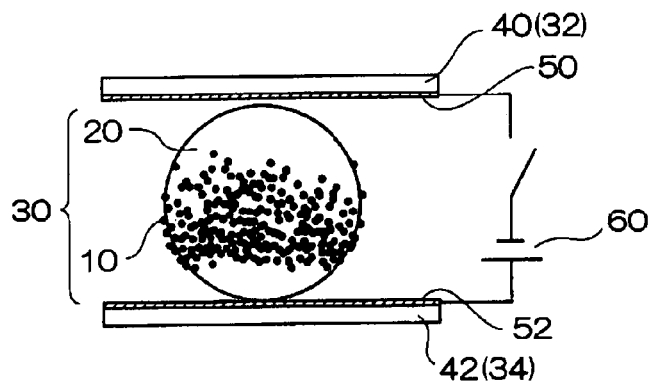
FIGS. 3A and 3B are schematic diagrams for explaining a display principle of a display method of an exemplary embodiment.
Figure 3B:
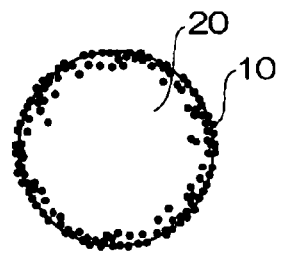

Here, FIG. 1A shows a state where electrophoretic particles 10 are localized at the other side 34 of the light-modulating layer 30; FIG. 1B shows a state of the electrophoretic particle holder 20 shown in FIG. 1A observed from one side 32 of the light-modulating layer 30; FIG. 2 shows a state where, in a state shown in FIG. 1A, an electric field is applied to the light-modulating layer 30 with the transparent electrode 50 set minus and the electrode 52 set plus, and the electrophoretic particles 10 move from the other side 34 of the light-modulating layer 30 to one side 32 of the light-modulating layer 30; FIG. 3A shows a state where an electric field application shown in FIG. 2 is finished, and the electrophoretic particles 10 are localized between one side 32 of the light-modulating layer 30 and the other side 34 of the light-modulating layer 30; FIG. 3B shows a state where the electrophoretic particle holder 20 shown in FIG. 3A is observed from one side 32 of the light-modulating layer 30; and FIG. 4 shows a state where, in a state shown in FIG. 3A, an electric field is applied to the light-modulating layer 30 with the transparent electrode 50 set minus and the electrode 52 set plus, and the electrophoretic particles 10 move from the other side 34 of the light-modulating layer 30 to one side 32 of the light-modulating layer 30.

Figure 4:
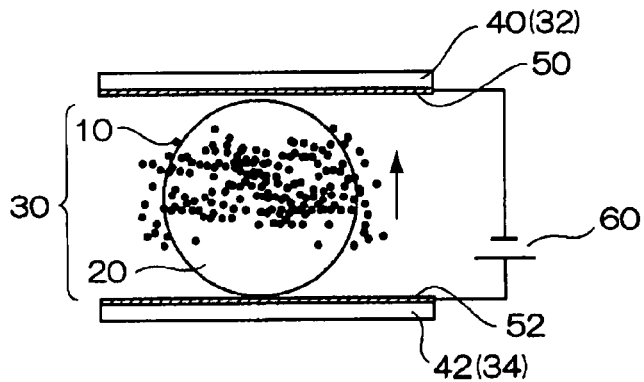
FIG. 4 is a schematic diagram for explaining a display principle of a display method of an exemplary embodiment.
Figure 5A:
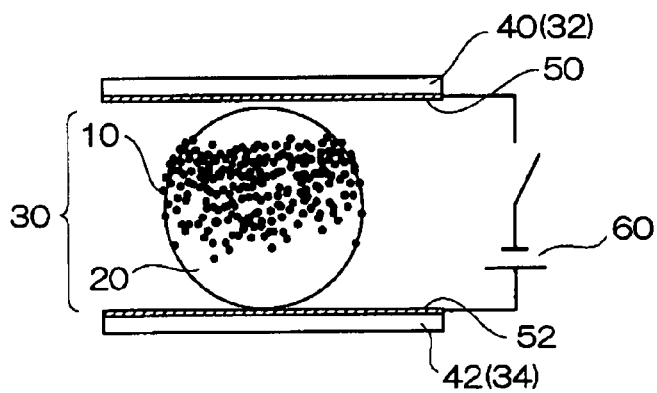
FIGS. 5A and 5B are schematic diagrams for explaining a display principle of a display method of an exemplary embodiment.
Figure 5B:
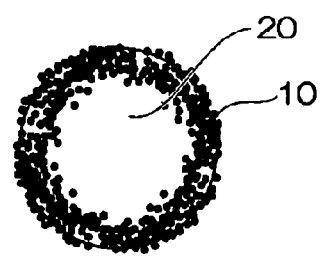
Figure 6:
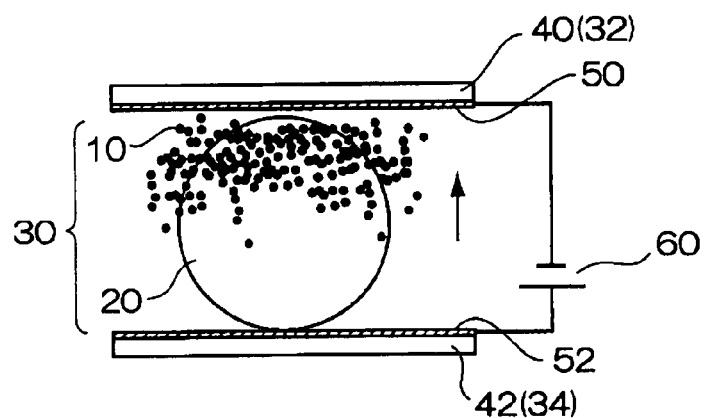
FIG. 6 is a schematic diagram for explaining a display principle of a display method of an exemplary embodiment.
Figure 7A:
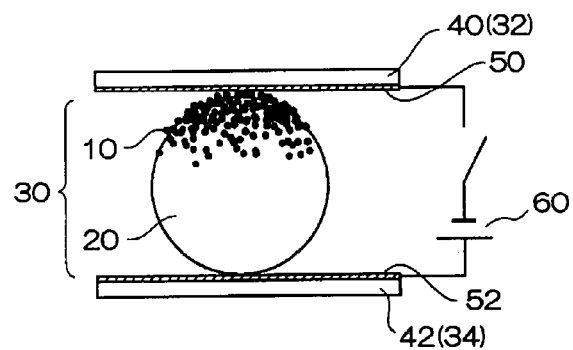
FIGS. 7A and 7B are schematic diagrams for explaining a display principle of a display method of an exemplary embodiment.
Figure 7B:
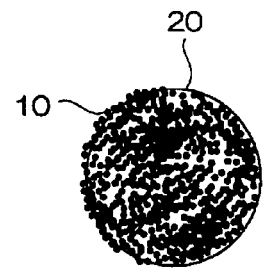

Furthermore, FIG. 5A shows a state where an electric field application shown in FIG. 4 is finished, and the electrophoretic particles 10 are localized between one side 32 of the light-modulating layer 30 and the other side 34 of the light-modulating layer 30; FIG. 5B shows a state where the electrophoretic particle holder 20 shown in FIG. 5A is observed from one side 32 of the light-modulating layer 30; FIG. 6 shows a state where, in a state shown in FIG. 5A, an electric field is applied to the light-modulating layer 30 with the transparent electrode 50 set minus and the electrode 52 set plus and thereby the electrophoretic particles 10 move from the other side 34 of the light-modulating layer 30 to one side 32 of the light-modulating layer 30; FIG. 7A shows a state where an electric field application shown in FIG. 6 is finished, and the electrophoretic particles 10 are localized at one side 32 of the light-modulating layer 30; and FIG. 7B shows a state where the electrophoretic particle holder 20 shown in FIG. 7A is observed from one side 32 of the light-modulating layer 30.

As shown in FIGS. 1A through 7B, the light-modulating layer 30 is disposed between a pair of transparent substrates 40 and 42 disposed facing to each other, a side of the light-modulating layer 30 at which the transparent substrate 40 is disposed represents one side 32 of the light-modulating layer 30, and a side of the light-modulating layer 30 at which the substrate 42 is disposed represents the other side 34 of the light-modulating layer 30. Furthermore, the light-modulating layer 30 contains electrophoretic particle holder 20 having a diameter equal to a gap between the transparent substrate 40 and substrate 42, electrophoretic particles 10 having a diameter smaller than that of the electrophoretic particle holder 20, and a dispersion medium (not shown in the drawings).

Furthermore, on a surface of the transparent substrate 40 where the substrate 42 is disposed, a transparent electrode 50 is disposed, on a surface of the substrate 42 where the transparent substrate 40 is disposed, an electrode 52 is disposed, and the pair of transparent electrodes 50 and 52 are connected to an electric field applicator 60. Accordingly, when an electric field is applied to the light-modulating layer 30, a potential gradient is formed in a direction from one side 32 of the light-modulating layer 30 to the other side 34 of the light-modulating layer 30 (or in an opposite direction thereof).

In the next place, a display operation will be described. In the beginning, in a state shown in FIGS. 1A and 1B, the electrophoretic particles 10 are localized at the other side 34 of the light-modulating layer 30; accordingly, when the electrophoretic particle holder 20 is observed from one side 32 of the light-modulating layer 30, the electrophoretic particles 10 are hidden by the electrophoretic particle holder 20. As a result, when the light-modulating layer 30 is observed from the transparent substrate 40 side, the color density due to the electrophoretic particles 10 becomes the minimum density.

Subsequently, when an electric field is applied as shown in FIG. 2, the electrophoretic particles 10 move from the other side 34 of the light-modulating layer 30 to one side 32 of the light-modulating layer 30 along a surface of the electrophoretic particle holder 20 or the neighborhood thereof and, when the electric field application is stopped, a state shown in FIGS. 3A and 3B is obtained.

In a state shown in FIGS. 3A and 3B, the electrophoretic particles 10 are localized in a position between one side 32 of the light-modulating layer 30 and the other side 34 of the light-modulating layer 30 and closer to the other side 34 of the light-modulating layer 30. Accordingly, when the electrophoretic particle holder 20 is observed from one side 32 of the light-modulating layer 30, although a large part of the electrophoretic particles 10, being hidden by the electrophoretic particle holder 20, cannot be observed, some of the electrophoretic particles 10 held on a surface of the electrophoretic particle holder 20 are observed. Accordingly, when the light-modulating layer 30 is observed from the transparent substrate 40 side, the color density due to the electrophoretic particles 10 becomes a density slightly higher than the minimum density (display of halftone).

Subsequently, an electric field is applied as shown in FIG. 4, the electrophoretic particles 10 move from the other side 34 of the light-modulating layer 30 to one side 32 of the light-modulating layer 30 along a surface of the electrophoretic particle holder 20 or the neighborhood thereof and, when the electric field application is stopped, a state shown in FIGS. 5A and 5B is obtained.

In a state shown in FIGS. 5A and 5B, the electrophoretic particles 10 are localized in a region between one side 32 of the light-modulating layer 30 and the other side 34 of the light-modulating layer 30 and closer to one side 32 of the light-modulating layer 30. Accordingly, when the electrophoretic particle holder 20 is observed from one side 32 of the light-modulating layer 30, although some of the electrophoretic particles 10 are hidden by the electrophoretic particle holder 20 and cannot be observed, a large part of the electrophoretic particles 10 held on a surface of the electrophoretic particle holder 20 are observed. Accordingly, when the light-modulating layer 30 is observed from the transparent substrate 40 side, the color density due to the electrophoretic particles 10 becomes a density higher than the color density in a state shown in FIGS. 3A and 3B (display of halftone).

Subsequently, an electric field is applied as shown in FIG. 6, the electrophoretic particles 10 move from the other side 34 of the light-modulating layer 30 to one side 32 of the light-modulating layer 30 along a surface of the electrophoretic particle holder 20 or the neighborhood thereof and, when the application of electric field is stopped, a state shown in FIGS. 7A and 7B is obtained.

In a state shown in FIGS. 7A and 7B, the electrophoretic particles 10 are localized at one side 32 of the light-modulating layer 30; accordingly, when the electrophoretic particle holder 20 is observed from one side 32 of the light-modulating layer 30, almost all of the electrophoretic particles 10 held on a surface of the electrophoretic particle holder 20 are confirmed. Accordingly, when the light-modulating layer 30 is observed from the transparent substrate 40 side, the color density due to the electrophoretic particles 10 becomes the maximum density.

On the other hand, as described above, by applying, to a light-modulating layer, an electric field stronger than the electric field capable of detaching the electrophoretic particles in a state of being held on a surface of the electrophoretic particle holder from a surface of the electrophoretic particle holder, one display state can be switched to the other display state. Here, a range of the electric field strength necessary for switching one display state to the other display state, though not particularly restricted, may be set to a value in a definite range, considering a power source that can be practically used and a thickness of the light-modulating layer suitable for applications of a display medium using a display method of the exemplary embodiment.

From the above viewpoints, an absolute value of a threshold value of an electric field by which the electrophoretic particles held on a surface of the electrophoretic particle holder are detached from a surface of the electrophoretic particle holder and go through a dispersion medium may be in the range of 100 V/cm to 30 kV/cm, and particularly in the range of 300 V/cm to 10 kV/cm.

When the absolute value of the threshold value of the electric field is less than 100 V/cm, in some cases, the memory property may be deteriorated, and when the absolute value of the threshold value of the electric field exceeds 30 kV/cm, in some cases, the energy consumption necessary for switching the display may be increased excessively.

The "threshold value of an electric field" is as follows. That is, when the absolute value of the electric field applied to a light-modulating layer is equal to or higher than the absolute value of the threshold value of the electric field (V/m), the electrophoretic particles can be detached from a surface of the electrophoretic particle holder to move in a dispersion medium and, in the case contrary to the above, the electrophoretic particles maintain a state of being held on a surface of the electrophoretic particle holder.

Furthermore, in a display method of the exemplary embodiment, as to an electric field applied to the light-modulating layer, a voltage value, a voltage waveform and an application time of the electric field may be set so as to enable to display a halftone. Here, as the voltage waveform, practically, one having a rectangular waveform may be used. However, without restricting the voltage waveform to the rectangular waveform, for example, one having a sine waveform or an irregular waveform may be used.

When in the invention an electric field is applied to a light-modulating layer, a potential gradient direction to the light-modulating layer may be always constant and electrodes used to apply the electric field to the light-modulating layer may be disposed so as to always maintain a constant distance in the potential gradient direction. In this case, since a voltage (V) of an electric field applied to the light-modulating layer and the electric field strength (V/cm) are proportional, there is a threshold voltage (V) corresponding to a threshold value of an electric field (V/cm).

On the other hand, when the display is carried out while switching a display state, a voltage waveform of an electric field applied to the light-modulating layer has cycles each including a first interval where an electric field is continuously applied at a voltage where an absolute value of the voltage is equal to or higher than an absolute value of a threshold voltage corresponding to a threshold value of an electric field and a second interval where an electric field is continuously applied at a voltage where an absolute value of the voltage is less than an absolute value of a threshold voltage corresponding to a threshold value of an electric field (wherein, the second interval may include a state where a voltage is 0 V, that is, an electric field is not applied).

When a voltage in the first interval in an a-th cycle ("a" means an integer of 1 or larger) is positive and a voltage in the first interval in an (a+1)-th cycle is negative, a continuation time of the second interval between the first interval in the a-th cycle and the first interval in the (a+1)-th cycle may be set at 0.

Here, when a halftone is displayed, a waveform in the first interval in at least any one of the cycles may be set so as to satisfy the following formula (5):

$$Ep < Emax \qquad \text{Formula (5)}$$

wherein Ep represents a value represented by the following formula (6), and Emax means a product of voltage·time (V·s) necessary for varying the display density from the maximum density to the minimum density or from the minimum density to the maximum density when an electric field is continuously applied to the light-modulating layer at a voltage where an absolute value of the voltage is equal to or higher than an absolute value of the threshold voltage $$E_p = \int_0^{t_p} V(t)\,dt \qquad \text{Formula (6)}$$

wherein t represents an arbitrary time (s) in the first interval in the at least any one of the cycles, tp represents a time (s) from a start to an end of the first interval in the at least any one of the cycles, and V (t) represents a voltage (V) at the time t.

When, as the electrophoretic particles, two or more kinds of electrophoretic particles different from each other in the threshold value of the electric field are used, the formula (5) can be applied based on the threshold voltage corresponding to a threshold value of an electric field of at least any one kind of the electrophoretic particles, the minimum density, and the maximum density.

Furthermore, a calculation method of a product (Emax) of voltage and time shown in the formula (5) is not particularly restricted. However, for example, when an electric field is continuously applied at an average voltage Vave (from t=0 to tp) of a voltage value V(t) in the first interval in the at least any one of the cycles, a time tc necessary for varying a display state from the maximum density to the minimum density or vice versa is determined and thereby a product of the Vave and the tc is obtained.

However, practically, a voltage waveform of an electric field applied to the light-modulating layer may be one that maintains a constant voltage (first voltage) at least in the first interval. Furthermore, it may be one that maintains a constant voltage (second voltage) in the second interval (that is, rectangular voltage waveform).

In the case where a voltage waveform is one that maintains a constant voltage (first voltage) at least in the first interval, when a time Tp during which an electric field is applied to the light-modulating layer at the first voltage satisfies the following formula (7) in a first interval in at least any one of the cycles, a halftone can be displayed:

$$Tp < Tmax \qquad \text{Formula (7)}$$

wherein Tp represents a time (s) during which an electric field is applied to the light-modulating layer at a first voltage (V) in a first interval in the at least any one of the cycles, and Tmax represents a time (s) necessary for varying the display density from the maximum density to the minimum density or from the minimum density to the maximum density when an electric field is continuously applied at the first voltage (V) to the light-modulating layer.

A value of the Tp may be set so as to satisfy the following formula (8):

$$T_{max} = \sum_{a=1}^{n} T_p(a) \qquad \text{Formula (8)}$$

wherein n denotes an integer of 2 or larger, a denotes an integer of 1 to n, and as the value increases, the display density (due to any one kind of the electrophoretic particles when two or more kinds of electrophoretic particles are used) varies in a direction from the minimum density side to the maximum density side (or vice versa), and Tp (a) represents a time (s) during which an electric field is applied to the light-modulating layer at a first voltage (V) and a value that can takes a value exceeding zero but less than the Tmax.

When the formula (8) is satisfied, even in one pixel unit, gradation display of (n+1) levels can be realized. Here, two levels mean that there are two display densities (for example, white state and black state) of the minimum density and the maximum density, and four levels mean that there are two different intermediate density states between the maximum density and the minimum density.

Here, the "intermediate density" fundamentally indicates the reflection (optical) density (measurement is carried out with X-rite 404 (manufactured by X-rite Corp.,) similarly to the above) and indicates a state where a plurality of density states separated with substantially equal intervals is present between the maximum density and the minimum density.

Here, the respective values of Tp(1) ... Tp(a) ..., Tp(n) are not necessarily the same. A variation in the display density when a display state is transferred from an a-th display state to an (a+1)-th display state and a variation in the display density when a display state is transferred from the (a+1)-th display state to an (a+2)-th display state may be set visually equal.

Furthermore, when, in the case where a display state other than the maximum density and the minimum density (a display state other than the 1st and the (n+1)-th display state) is displayed, a display state is switched to an initial state (the maximum density or minimum density), a time during which an electric field is applied at the first voltage is not particularly restricted as far as it is equal to or longer than a necessary minimum time for switching a display state to the initial state.

When the formula (8) is satisfied, n, though being necessarily 2 or more, may be 4 or more. The upper limit thereof, without particularly restricted, may be 256 or less, particularly 64 or less. When the number of levels is increased excessively, a large memory amount for display drive becomes necessary, thus raising part cost and making a circuit board larger. Furthermore, it takes a long time for processing image data for representing gradations, so that a waiting time up to display becomes longer.

-Display Medium-

In the next place, a display medium that makes use of a display method of the exemplary embodiment will be described. The display medium of the exemplary embodiment, without particularly restricted as far as it has a configuration where the display method of the invention can be implemented, may have a configuration below.

That is, the display medium of the exemplary embodiment includes at least a pair of substrates at least one of which has optical transparency; a dispersion medium positioned in a gap between the pair of substrates; one or more kinds of electrophoretic particles or two or more kinds of electrophoretic particles different in color from each other, included in the dispersion medium; and an electrophoretic particle holder that is disposed between the pair of substrates and have a function of sticking and holding the electrophoretic particles.

The electrophoretic particle holder has a function of controlling, by use of an external voltage, a movement amount of electrophoretic particles on the electrophoretic particle holder.

The "movement amount" indicates, in the exemplary embodiment, a movement amount when the electrophoretic particles are detached from a surface of an electrophoretic particle holder, that is, an outer circumferential surface of the electrophoretic particle holder, or, when the electrophoretic particle holder has pores, a state of being held in an arbitrary region such as an inner circumferential surface of the pore, and moved in a dispersion medium to a state of being held in other region on a surface of the electrophoretic particle holder or a region distanced from the electrophoretic particle holder.

Specifically, the "movement amount" is represented by an absolute value of a threshold value of an electric field at which the electrophoretic particles held on a surface of the electrophoretic particle holder are detached from a surface of the electrophoretic particle holder and moved in the dispersion medium. The "absolute value of a threshold value of an electric field at which the electrophoretic particles held on a surface of the electrophoretic particle holder are detached from the surface of the electrophoretic particle holder and moved in the dispersion medium" may satisfy the above-mentioned range.

The display medium of the exemplary embodiment, having a configuration capable of carrying out the display method of the exemplary embodiment, is excellent in the memory property and can display a halftone as well. However, when the halftone is displayed, an electric field of which voltage waveform is controlled so as to be able to display the halftone (for example, an electric field having a waveform satisfying above-mentioned formula (5), (7) or (8)) is applied. In this case, an external electric field applicator capable of applying an electric field having the voltage waveform may well be used. However, when the display medium of the exemplary embodiment is used to display, an electric field suitable for displaying a halftone is not necessarily applied, and an electric field suitable for analog display may be applied.

When an electric field is applied to a member located between a pair of substrates that is included in a display medium (dispersion medium, electrophoretic particles and electrophoretic particle holder), that is, when an electric field is applied to a light-modulating layer, in the case where the display medium includes a pair of electrodes, the pair of electrodes can be used to apply the electric field, and, in the case where the display medium does not include a pair of electrodes, external electrodes can be used. However, since only connecting to an external power source enables to use the display medium, a pair of electrodes may be included in a display medium. In this case, electrodes that are used to apply an electric field to the light-modulating layer may be disposed on surface sides of the pair of substrates at which the substrates face each other, or, at a substrate (transparent substrate) side having optical transparency of the pair of substrates, an electrode having optical transparency (transparent electrode) may be disposed.

The display medium of the exemplary embodiment may include one or more kinds of electrophoretic particles in a dispersion medium. However, electrophoretic particles contained in the dispersion medium may be constituted of two or more kinds of electrophoretic particles different from each other in a color formed in a state of being dispersed in the dispersion medium and in an absolute value of a threshold value of an electric field at which electrophoresis can be realized in a dispersion medium. In this case, color display can be realized.

Furthermore, from the viewpoint of enabling a practical color display, the two or more kinds of electrophoretic particles may be constituted of electrophoretic particles that form a red color, electrophoretic particles that form a green color and electrophoretic particles that form a blue color, in a state of being dispersed in a dispersion medium.

Here, "one or more kinds of electrophoretic particles are contained in a dispersion medium" means that, when a dispersion medium positioned between a pair of substrates is divided into a plurality of cells with partition walls, the one or more kinds of electrophoretic particles are contained in each dispersion medium of the cells.

On the other hand, in the case where a practical color display is carried out when in a gap between a pair of substrates partition walls are disposed to partition the gap to dispose cells in each of which a dispersion medium containing one kind of electrophoretic particles is positioned, the cells may be constituted of three kinds of cells, that is, a cell (R cell) in which a dispersion medium containing electrophoretic particles that form a red color in a dispersed state in a dispersion medium is positioned, a cell (G cell) in which a dispersion medium containing electrophoretic particles that form a green color in a dispersed state in a dispersion medium is positioned, and a cell (B cell) in which a dispersion medium containing electrophoretic particles that form a blue color in a dispersed state in a dispersion medium is positioned.

In this case, with three cells (3 pixels) constituted of an R cell, a G cell and a B cell as one pixel, color display can be controlled. The three cells are disposed adjacent to each other or neighboring to each other.

-Electrophoretic Particle Holder-

The electrophoretic particle holder, as far as it has a function of sticking and holding electrophoretic particles on a surface thereof, is not particularly restricted. However, inorganic particles constituted of a material such as titanium oxide and zinc oxide, particulate members (electrophoretic particle holder particles) such as organic particles constituted of a material such as a methyl methacrylate resin, a styrene-acryl resin, a silicone resin and a polytetrafluoroethylene resin, porous bodies such as gelatin and porous silica, network structures such as polymers having a network structure such as polyacrylamide and aggregates of fibers (in a state where independent cord-shaped materials are regularly or irregularly entangled) may be used.

In order that the charging polarity of electrophoretic particles used and the adherence thereof to the electrophoretic particles may realize a good balance in the sustainability of a display state and the display of the halftone, a material that constitutes the electrophoretic particle holder may be selected, or a surface treatment may optionally be applied to the electrophoretic particle holder.

That is, a function of sticking and holding electrophoretic particles can be realized as follows. That is, as mentioned above, a material that constitutes an electrophoretic particle holder is selected, a surface treatment is optionally applied to the electrophoretic particle holder, the charging polarity and charging amount are controlled so that the holder is at least partially charged with a polarity opposite to that of all kinds of the electrophoretic particles, or the porosity, the aperture ratio of the pores and a diameter of the pore are controlled.

When an electrophoretic particle holding particle is used as an electrophoretic particle holder, between a pair of substrates, at least two or more particulate members (electrophoretic particle holding particles) may be disposed. However, practically, the electrophoretic particle holding particles may be packed at a density to an extent where the electrophoretic particle holding particles cannot move from each other. Furthermore, the electrophoretic particle holding particles may be disposed in a state of being fixed on a surface of at least any one of the substrates by laminating in one or more layers and using heat sealing. Optionally, a particulate member that does not have a function as the electrophoretic particle holder may be mixed thereto. However, fundamentally, the electrophoretic particle holding particles alone may be used.

An average particle diameter of the electrophoretic particle holding particles is not particularly restricted. However, the electrophoretic particle holding particles may have an average particle diameter such that, when the particles are packed between a pair of substrates or disposed by laminating on a surface of a substrate, through gaps of the electrophoretic particle holding particles adjacent to each other, the electrophoretic particles can pass.

Accordingly, an average particle diameter of the electrophoretic particle holding particles may be ten times or more of an average particle diameter of all kinds of the electrophoretic particles or 25 times or more. When the average particle diameter of the electrophoretic particle holding particles is less than ten times of an average particle diameter of all kinds of the electrophoretic particles, since the electrophoretic particles cannot go through the gaps between the electrophoretic particle holding particles adjacent to each other, in some cases, a display state can be switched with difficulty. The upper limit of the average particle diameter of the electrophoretic particle holding particles is not particularly restricted. However, it may be equal to or less than a distance between a pair of substrates (a thickness of a light-modulating layer).

An average particle diameter of the electrophoretic particle holding particles is obtained in such a manner that electrophoretic particle holding particles used in a display medium are observed with a SEM or a TEM, and, based on the SEM image or TEM image, from areas of ten particles, an average particle diameter is obtained. An average particle diameter of all kinds of the electrophoretic particles is obtained in such a manner that an average particle diameter of each kind of the electrophoretic particles is obtained from areas of ten particles similarly to the above, and then the sum of the each average particle diameter is divided by the number of kinds of the electrophoretic particles to obtain the average particle diameter.

Here, when a dispersion medium positioned between a pair of substrates is partitioned into a plurality of cells with partition walls, parameter values relating to particle shapes and sizes such as average particle diameters of the electrophoretic particle holder particles and all kinds of the electrophoretic particles mean values obtained in a cell unit.

On the other hand, when, as an electrophoretic particle holder, a porous body, a network structure or an aggregate of fibers is used, these members can be disposed in a state of being filled between a pair of substrates or in a state of being fixed on a surface of at least any one of substrates by heat sealing.

An average pore diameter of a porous body, a network structure or a fiber aggregate, as far as it is a size in which all kinds of the electrophoretic particles can move in the member when an electric field is applied, is not particularly restricted. However, an average pore diameter of the porous body, network structure or fiber aggregate may be 5 times or more or 10 times or more of an average particle diameter of electrophoretic particles of the kind of which average particle diameter is the largest. When the average pore diameter of the porous body, network structure or fiber aggregate is less than 10 times of an average particle diameter of all kinds of the electrophoretic particles, since the electrophoretic particles cannot pass through pores of the porous body, network structure or fiber aggregate, in some cases, a display state can be switched with difficulty. The upper limit of the average pore diameter of the porous body, network structure or fiber aggregate is not particularly restricted. However, when it is excessively large, since a surface area of the porous body, network structure or fiber aggregate in a unit volume becomes excessively small, a halftone may be displayed with difficulty or a holding function of electrophoretic particles may be deteriorated; accordingly, an average pore diameter of the porous body, network structure or fiber aggregate may be 100 μm or less.

An average pore diameter of the porous body, network structure or fiber aggregate is obtained from SEM observation of a section of the members. An average pore diameter is obtained by measuring pore diameters of arbitrary 100 points of pores observed in a section of the member, followed by averaging the pore diameters at the respective points.

Furthermore, the porosity of an electrophoretic particle holder constituted of the porous body, network structure or fiber aggregate may be in the range of 20 to 60%. In this case, the electrophoretic particles of the number necessary for display may be contained, a desired holding force may be maintained, and the coloring characteristics of the holder may be sufficiently exerted. More particularly, it may be in the range of 30 to 50%.

As the fiber aggregate, a block body in which fibers are simply gathered, one in which fibers are densely arranged, textile-like one in which threads obtained by twisting fibers are knit, net-shaped one or fabric-like one obtained by weaving, non-woven fabric one obtained by partially melting or entangling fibers, web-shaped one and sheet-like one may be exemplified.

Examples of the fiber aggregates include a non-woven fabric, a polymer film, cloth and paper. Among these, a non-woven fabric may be used. In the case of the non-woven fabric, since a fiber diameter and an inter-fiber distance may be independently designed, a function of holding electrophoretic particles may be readily adjusted.

As fibers that constitute a fiber aggregate, for example, polyethylene, polystyrene, polyester, polyacryl, polypropylene and a fluororesin such as polytetrafluoroethylene (PTFE) can be applied. Because of readiness of charging by a corona treatment, polypropylene and PTFE fibers may be used.

Furthermore, the density of the fiber aggregate, from reasons of maintaining a desired holding force to electrophoretic particles of the number necessary for display, and of maintaining the physical strength thereof, may be in the range of 10 to 70 g/m$^2$, and particularly in the range of 20 to 50 g/m$^2$.

Diameters of fibers that constitute the fiber aggregate may be in the range of 0.1 to 20 μm and particularly in the range of 0.1 to 3 μm. In this case, a sufficient surface area and physical strength may be secured.

When the porous body, network structure or fiber aggregate is used as the electrophoretic particle holder, by controlling the density, porosity, average opening diameter and the electric characteristics thereof, a holding force of the electrophoretic particles may be controlled.

A color of the electrophoretic particle holder, as far as it is a color different from that of the electrophoretic particles, is not particularly restricted. However, usually, the electrophoretic particle holder may be colored.

The electrophoretic particle holder may be transparent. However, in this case, for example, it is necessary to use the electrophoretic particle holding particles mixed with colored particulate members that do not have a function as the electrophoretic particle holder. This is because when the electrophoretic particle holder is transparent, a function of shielding light therewith to hide electrophoretic particles localized at a side of a substrate that is not transparent of a pair of substrates when seen from a transparent substrate side (hiding function) is lacked, and thereby, even when a third display process is carried out, a halftone display cannot be achieved. Accordingly, when a transparent electrophoretic particle holder is used, another member that has the hiding function is necessarily used.

The electrophoretic particle holder may have a white color. In this case, after a second display process has been carried out, a white color can be displayed.

The polarity and charging properties of the electrophoretic particle holder may be controlled with a primary material itself that constitutes the electrophoretic particle holder. However, a charge control agent may optionally be added.

As the charge control agent, for example, known ones that are used for, for example, electrophotography toners can be used. Examples thereof include quaternary ammonium salts such as cetylpyridyl chloride, BONTRON P-51, BONTRON P-53, BONTRON E-84 and BONTRON E-81 (trade name, all manufactured by Orient Chemical Industries, Ltd.), salicylic acid metal complexes, phenolic condensation products, tetraphenyl compounds, metal oxide particles, and metal oxides particles surface-treated with various coupling agents.

Furthermore, in order to control the charging properties of the electrophoretic particle holder, surface-treated one can optionally be used.

As a method of surface treatment, a chemical treatment method with a surface treatment agent such as a silane-coupling agent or a physical treatment method in which some physical stimulus is imparted on a surface thereof to modify a surface can be exemplified. In the invention, the chemical treatment method may be used.

As the surface treatment agents that can be used, for example, in a hydrophobic treatment, silane compounds, silicone compounds or fatty acids can be used, and in the hydrophilic treatment, alcohols, hydrophilic resins or inorganic compounds can be used.

As the silane compounds that can be used in the hydrophobic treatment, a known silane coupling agent that has a molecular structure containing a reactive portion that reacts with the electrophoretic particle bodies and a hydrophobic portion can be used.

Specifically, octadecyltrimethoxysilane, phenetyltrimethoxysilane, aminopropyltriethoxysilane, 3-aminopropyltrimethoxysilane, methacryloxytrimethoxysilane, methoxytrimethylsilane, 3-aminopropyldiethoxymethylsilane, N-(2-aminoethyl)-3-aminopropyltrimethoxysilane and N-(2-aminoethyl)-3-aminopropylmethyldimethoxysilane can be exemplified.

As the silicone compounds that are used in the hydrophobic treatment, methylpolysiloxane, octamethylcyclotetrasiloxane, decamethylcyclopentanesiloxane, methylcyclopolysiloxane and methylhydrogenpolysiloxane can be exemplified.

As the fatty acids that are used in the hydrophobic treatment, lauric acid, myristic acid, stearic acid, oleic acid, linoleic acid, linolenic acid, hydroxy fatty acid, caproic acid, caprylic acid, palmitic acid, behenic acid, palmitoleic acid, erucic acid, alkali metal salts such as sodium salts and potassium salts thereof, alkali earth metal salts such as magnesium salts and calcium salts thereof or esters thereof can be exemplified.

As alcohols that are used in the hydrophilic treatment, methyl alcohol, ethyl alcohol, propanol, isopropanol, butyl alcohol, glycerin, propylene glycol and 1,3-butylene glycol can be exemplified.

As the hydrophilic resins that are used in the hydrophilic treatment, acrylic acid, polyvinyl alcohol, polyvinyl pyrrolidone, polyamide and polyimide can be exemplified.

As the inorganic oxides that are used in the hydrophilic treatment, silica, alumina and titania can be exemplified.

When the electrophoretic particle includes a soft magnetic material or a ferromagnetic material, the electrophoretic particle holder may be contain a magnetic material. Thereby, the adherence working between the electrophoretic particle and the electrophoretic particle holder can be controlled by, in addition to an electrostatic force, a magnetic force as well.

Here, when the electrophoretic particle contains a soft magnetic material, in the electrophoretic particle holder, a ferromagnetic material can be added, and, when the electrophoretic particle contains a ferromagnetic material, in the electrophoretic particle holder, a soft magnetic material or a ferromagnetic material can be added. As the magnetic materials that can be used in the electrophoretic particle or the electrophoretic particle holder, known ones can be used. That is, as the soft magnetic materials, for example, silicon steel, Permalloy, and amorphous metal can be used, and, as the ferromagnetic materials, iron oxide, carbon steel, ferrite and samarium can be used. The kind and an addition amount of the magnetic material that is used in the electrophoretic particle or the electrophoretic particle holder can be selected so that a desired threshold electric field value may be obtained. Furthermore, as colored magnetic powder that can be used as the electrophoretic particle, for example, fine particle-size colored magnetic powders described in, for example, JP-A No. 2003-131420 can be used.

-Electrophoretic Particle-

The electrophoretic particle that is used in the invention is a particle having the characteristics capable of being charged with a positive or negative polarity so that it may move in a dispersion medium along a direction of an electric field gradient when the particle is disposed in an electric field. Examples thereof include glass beads, particles of metal oxide such as alumina or titanium oxide, thermoplastic or thermosetting resin particles, ones obtained by fixing a coloring material on a surface of the resin particles, particles containing a coloring material in thermoplastic or thermosetting resin and particles having the characteristics of forming a color in a state of being dispersed in a dispersion medium.

Examples of the thermoplastic resins that are used to produce the electrophoretic particles include homopolymers or copolymers of styrenes such as styrene and chlorostyrene; monoolefins such as ethylene, propylene, butylene and isoprene; vinyl esters such as vinyl acetate, vinyl propionate, vinyl benzoate and vinyl lactate; (x-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl acrylate and dodecyl acrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone.

Examples of the thermosetting resins that can be used to produce the electrophoretic particles include crosslinked resins such as crosslinked copolymers mainly made of divinyl benzene and crosslinked polymethyl methacrylate; a phenol resin; a urea resin; a melamine resin; a polyester resin; and a silicone resin. Examples of particularly typical binding resins include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, polypropylene, polyester, polyurethane, an epoxy resin, a silicone resin, polyamide, modified rosin and paraffin wax.

As the coloring materials, organic or inorganic pigments and oil-soluble dyes can be used. Examples thereof include magnetic powders such as magnetite and ferrite, carbon black, titanium oxide, magnesium oxide, zinc oxide and known coloring materials such as phthalocyanine copper cyan color material, azo yellow color material, azo magenta color material, quinacridone magenta color material, red color material, green color material and blue color material. Specifically, aniline blue, calcoil blue, chrome yellow, ultramarine blue, Dupont oil red, quinoline yellow, methylene blue chloride, phthalocyanine blue, malachite green oxalate, lamp black, rose Bengal, C.I. pigment red 48:1, C.I. pigment red 122, C.I. pigment red 57:1, C.I. pigment yellow 97, C.I. pigment blue 15:1 and C.I. pigment blue 15:3 can be exemplified as typical ones.

Furthermore, porous spongy particles incorporating air or hollow particles can be used as white particles.

In a resin for electrophoretic particles, a charge control agent may optionally be added. As the charge control agent, known ones that are used as a toner material for electrophotography can be used. Examples thereof include quaternary ammonium salts such as cetylpyridyl chloride, BONTRON P-51, BONTRON P-53, BONTRON E-84 and BONTRON E-81 (trade name, all manufactured by Orient Chemical Industries, Ltd.), salicyclic acid type metal complexes, phenolic condensation products, tetraphenyl compounds, metal oxide fine particles, and metal oxide fine particles surface-treated with various kinds of coupling agents.

Inside or on a surface of electrophoretic particles, a magnetic material may optionally be mixed. As the magnetic material, a color coated inorganic magnetic material or organic magnetic material may be used. Furthermore, a transparent magnetic material, in particular, a transparent organic magnetic material does not disturb coloring of a coloring pigment and is smaller in the specific gravity than an inorganic magnetic material.

As the colored magnetic powder, for example, a small diameter colored magnetic powder described in JP-A No. 2003-131420 can be used. One that has a magnetic particle that is a nucleus and a coloring layer laminated on a surface of the magnetic particle is used. As the coloring layer, a pigment may be selected to color a magnetic powder opaque. However, for example, an optical interference film may be used. The optical interference film is a thin film that is made of an achromatic material such as $SiO_2$ and $TiO_2$ and has a thickness equivalent to a light wavelength, which wavelength-selectively reflects light due to optical interference in a thin film.

On a surface of the electrophoretic particle, an external additive may optionally be adhered. A color of the external additive may be transparent so as not to affect on a color of the particle.

As the external additive, inorganic particle of metal oxide such as silicon oxide (silica), titanium oxide or alumina is used. In order to control the charging properties, fluidity and environmental dependency of the inorganic particle, these can be surface-treated with a coupling agent or silicone oil.

As the coupling agents, there are positively charging coupling agents such as an aminosilane coupling agent, aminotitanium coupling agent and nitrile coupling agent and negatively charging coupling agents such as a silane coupling agent that does not contain a nitrogen atom (composed of atoms other than nitrogen), titanium coupling agent, epoxy silane coupling agent and acryl silane coupling agent. Furthermore, as the silicone oils, there are positively charging silicone oils such as amino modified silicone oils and negatively charging silicone oils such as dimethyl silicone oil, alkyl modified silicone oil, α-methylsulfone modified silicone oil, methylphenyl silicone oil, chrolophenyl silicone oil and fluorine modified silicone oil. These are selected according to the desired resistance of the external additive.

Among such external additives, well-known hydrophobic silica and hydrophobic titanium oxide may particularly be used. For example, a titanium compound that is described in JP-A No. 10-3177 and obtained by a reaction between $TiO(OH)_2$ and a silane compound such as a silane coupling agent may be used. As the silane compound, any one of chrolosilane, alkoxysilane, silazane and special silyl agent can be used. The titanium compound is prepared by reacting a silane compound or silicone oil with $TiO(OH)_2$ prepared in a wet process followed by drying. Since the titanium compound is not subjected to a sintering process at several hundred degrees centigrade, Ti and Ti will not be strongly coupled, aggregation will not occur at all, and the particles are approximately in a primary particle state. Furthermore, since the silane compound or silicone oil is directly reacted with $TiO(OH)_2$, a processing amount of the silane compound or the silicone oil can be increased. By adjusting the processing amount of the silane compound, the charging characteristics can be controlled, and the resulting charging ability can be improved more significantly than that of existing titanium oxide.

The primary particle diameter of the external additive may be generally in the range of 5 to 100 nm, and specifically in the range of 10 to 50 nm without restricting thereto.

A blending ratio of the external additive and the electrophoretic particle is adjusted appropriately according to the particle diameter of the electrophoretic particles and the particle diameter of the external additive. When the added amount of the external additive is too much, the external additive is partially separated from the surface of the particle and sticked to the surface of the other particles, and thus desired charging characteristics cannot be obtained. In general, an amount of the external additive is in the range of 0.01 to 3 parts by weight and more particularly in the range of 0.05 to 1 part by weight with respect to 100 parts by weight of the particles.

When the external additive is added on a surface of the electrophoretic particle, the external additive may be fixed on a surface of the electrophoretic particle with impact force, or, by heating a surface of the electrophoretic particle, the external additive may be solidly fixed on a particle surface. Thereby, the external additive is prevented from separating from the electrophoretic particle, the external additives of different polarities are prevented from strongly aggregating, and an aggregate of the external additive difficult to be dissociated by an electric field is prevented from forming, resulting in preventing image quality deterioration.

As a method of preparing the electrophoretic particle, any conventionally known methods can be used. For example, a method described in JP-A No. 7-325434 can be used. That is, a method where a resin, a pigment and a charge control agent are measured so as to be a predetermined mixing ratio, the resin is heated and melted, the pigment is added thereto, followed by mixing, dispersing and cooling, further followed by preparing particle by use of a crusher such as a jet mill, hammer mill or turbo-mill, still further followed by dispersing the obtained particle in a dispersion medium. Furthermore, a method where particles in which a charge control agent is contained are prepared according to a polymerization method such as a suspension polymerization, emulsion polymerization or dispersion polymerization or a coacervation, melt dispersion or emulsion coagulation method, followed by dispersing in a dispersion medium to prepare a particle-dispersed liquid may be used. Still further, a method where at a temperature that can plasticize a resin, however does not boil a dispersion medium and is lower than a decomposition temperature of the resin, charge control agent and/or coloring agent, an appropriate apparatus that can disperse and knead the resin, coloring material, charge control agent and the dispersion medium is used can be exemplified. Specifically, a pigment, the resin and the charge control agent are heated and melted by use of a planetary mixer or kneader in a dispersion medium, and, by using the temperature dependency of the solubility of the resin in a solvent, cooled while a melt mixture is stirred to coagulate/precipitate to prepare electrophoretic particles.

Furthermore, a method where the above-described raw materials are placed in an appropriate vessel provided with particulate media for dispersion and kneading such as an attritor or a heated vibration mill such as a heated ball mill and the vessel is heated to an appropriate temperature range of for example 80 to 160° C. to disperse and knead can be used. As the particulate media, steels such as stainless steel and carbon steel, alumina, zirconia or silica may be used. When an electrophoretic particle is prepared according to the method, after previously fluidized raw materials are further dispersed in the vessel by use of the particulate media, the dispersion medium is cooled to precipitate a resin containing the coloring agent from the dispersion medium. The particulate media, while a moving state is still maintained during and after cooling, generates shear and/or impact to make a particle diameter smaller.

In the next place, electrophoretic particle that has the characteristics of forming a color in a dispersed state in a dispersion medium will be described.

Here, "forming a color in a dispersed state in a dispersion medium" means that when, in a state where electrophoretic particles are dispersed in a dispersion medium, a dispersion liquid in which electrophoretic particles are dispersed is visually observed, an observable hue is exhibited. The hue at this time is observed with a thickness of a dispersion liquid in an observing direction of in the range of substantially 10 μm to 1 cm. The hue can be variously changed by changing the shape and particle diameter of the electrophoretic particles or a material that constitutes the electrophoretic particles.

When a dispersion medium positioned between a pair of substrates is partitioned into a plurality of cells by use of partition walls, the polarity of the electrophoretic particle may be same at least in a cell unit.

As the electrophoretic particle that forms a color in a dispersed state, coloring agents such as organic pigments, inorganic pigments, colored glass and dyes, resin particles containing these coloring agents or metal particles can be used, and optionally, ones obtained by surface-treating a surface of the particles with a silane coupling agent can be used. As one example, particles constituted of a black carbon-dispersed PMMA (polymethyl methacrylate) resin prepared by a suspension polymerization method can be used.

As the organic pigments, inorganic pigments and dyes that can be used as a coloring agent, known ones can be used. Examples of the organic pigments include azo pigments, polycondensation azo pigments, metal complex azo pigments, flavanthrone pigments, benzimidazolone pigments, phthalocyanine pigments, quinacridone pigments, anthraquinone pigments, anthrapyridine pigments, pyranthrone pigments, dioxazine pigments, perylene pigments, perinone pigments, isoindolinone pigments, quinophthalone pigments, thioindigo pigments, and indanthrene pigments. Examples of inorganic pigments include zinc oxide, titanium dioxide, zirconium oxide, antimony white, carbon black, black iron oxide, titanium boride, red iron oxide, Mapico yellow, red lead, cadmium yellow, zinc sulfide, lithopone, barium sulfide, cadmium selenide, barium sulfate, lead chromate, lead sulfate, barium carbonate, calcium carbonate, white lead, and alumina white. Examples of dyes include nigrosine dyes, phthalocyanine dyes, azo dyes, anthraquinone dyes, quinophthalone dyes and methane dyes.

As the resin particle including a coloring material, ones obtained according to a known dry method where a resin solid matter in which a coloring material is dispersed is kneaded and pulverized or ones obtained according to a known wet method where resin particles are obtained by granulating in a dispersion liquid in which raw materials such as a coloring material and a resin are dispersed can be used.

As the electrophoretic particles that form a color in a dispersion state, metal particles can be used as well, and optionally, ones obtained by surface treating a surface of the particle with a silane coupling agent can be used as well. The metal particle may be a metal particle containing a precious metal.

The metal particles that can be used as the electrophoretic particles have a color strength due to surface plasmon resonance, that is, the particles themselves have characteristics to form a color.

The color due to surface plasmon resonance of the metal particles is caused by the plasma oscillation of the electrons, being based on the color formation mechanism called the plasmon absorption. It is said that the color formation based on the plasmon absorption is caused by the free electrons quivered by a photoelectric field in the metal, which results in formation of electric charges on the particle surface to generate a non-linear polarization. This color formation by the metal particle is high in color saturation and light transmittance and excellent in durability. Such a color formation by the metal particle can be found in so-called nano-particles, which have a particle diameter in the range of substantially several to several tens nanometers. From viewpoints of clearer color hue, the narrower a particle size distribution of metal particles is, the larger an advantage is. Accordingly, an average particle diameter (volume average particle diameter) of the metal particles may be in the range of 1 to 100 nm and particularly in the range of 5 to 50 nm.

The metal particles can form various colors depending on the kind of metals contained in the particles, a shape of the particle and a volume average particle diameter. Accordingly, when metal particles wherein these are controlled are used, various colors including RGB colors may be obtained. Accordingly, when a display medium is prepared with a dispersion liquid obtained by dispersing metal particles having a color strength due to surface plasmon resonance in a dispersion medium, a color display can be performed. Further, when metal particle dispersion liquids of the respective colors corresponding to R, G, B are used, a display medium according to an RGB system can be prepared.

Volume average particle diameters of the metal particles for exhibiting the respective colors of R, G, B in an RGB system, being dependent on metals used, preparation conditions of the particles and shapes, cannot be particularly restricted. However, in the case of for example gold colloid particles, as the volume average particle diameter becomes larger, R color formation, G color formation and B color formation tend to occur in this order.

As a method of measuring the volume average particle diameter in the invention, a laser diffraction/scattering method where a laser beam is illuminated to a particle group, and, from intensity distribution patterns of diffracted and scattered light emitted therefrom, an average particle diameter is measured is adopted. For example, a particle diameter can be measured with a MICROTRAC particle size distribution analyzer MT3300 (manufactured by Nikkiso Co., Ltd.).

As the metals contained in the metal particles, known precious metals such as gold, silver, ruthenium, rhodium, palladium, osmium, iridium and platinum may be used, and particularly gold and/or silver can be used. Metals (for example, copper) other than precious metals can be used as well. Furthermore, two or more kinds of metals may be contained in the metal particles.

Furthermore, in order to control the charging properties of the electrophoretic particle, a surface of the electrophoretic particle may optionally be surface treated (hydrophilic treatment or hydrophobic treatment).

As a method of surface treatment, a chemical treatment method with a surface treatment agent such as a silane-coupling agent or a physical treatment method in which some physical stimulus is imparted on a surface of the electrophoretic particles to modify a surface can be exemplified. In the invention, the chemical treatment method may be used.

A surface treatment agent that can be used can be selected in view of the affinity with a material that constitutes a particle body of the electrophoretic particle. For example, in a hydrophobic treatment, silane compounds, silicone compounds or fatty acids can be used.

As the silane compounds that can be used in the hydrophobic treatment, known silane coupling agents that has a molecular structure containing a reactive portion that reacts with the electrophoretic particle and a hydrophobic portion can be used.

Specifically, octadecyltrimethoxysilane, phenetyltrimethoxysilane, aminopropyltriethoxysilane, 3-aminopropyltrimethoxysilane, methacryloxytrimethoxysilane, methoxytrimethylsilane, 3-aminopropyldiethoxymethylsilane, N-(2-aminoethyl)-3-aminopropyltrimethoxysilane and N-(2-aminoethyl)-3-aminopropylmethyldimethoxysilane can be exemplified.

As the silicone compounds that are used in the hydrophobic treatment, methylpolysiloxane, octamethylcyclotetrasiloxane, decamethylcyclopentanesiloxane, methylcyclopolysiloxane and methylhydrogenpolysiloxane can be exemplified.

As the fatty acids that are used in the hydrophobic treatment, lauric acid, myristic acid, stearic acid, oleic acid, linoleic acid, linolenic acid, hydroxy fatty acid, caproic acid, caprylic acid, palmitic acid, behenic acid, palmitoleic acid, erucic acid, alkali metal salts such as sodium salts and potassium salts thereof, alkali earth metal salts such as magnesium salts and calcium salts thereof or esters thereof can be exemplified.

Furthermore, in the case where the electrophoretic particle holder has a size or own weight larger than that of the electrophoretic particle, when, other than the electrostatic force, a particle diameter of the electrophoretic particle is controlled, an intermolecular force working with the electrophoretic particle holder can be controlled and thereby the adherence between both can be controlled.

"The electrophoretic particle holder has a size or own weight larger than that of the electrophoretic particle" means that a mass of the electrophoretic particle holder is 100 times or more of a mass of the electrophoretic particle, and, when the "electrophoretic particle holder" is composed of electrophoretic particles, means that an average particle diameter thereof is 10 times or more of an average particle diameter of the electrophoretic particles.

—Dispersion Medium—

A dispersion medium contains at least an insulating liquid and a volume resistance value thereof may be $10^3$ Ωcm or more, particularly in the range of $10^7$ to $10^{19}$ Ωcm and more particularly in the range of $10^{10}$ to $10^{19}$ Ωcm. When the volume resistance value is set in the range, more effectively, air bubbles due to electrolysis of the dispersion medium caused by an electrode reaction can be inhibited from occurring. In this case, the electrophoresis characteristics of the electrophoretic particles are not damaged every energization and excellent repetition stability can be imparted. Furthermore, in the dispersion medium, other than an insulating liquid having the volume resistance value, optionally, a dispersion stabilizer such as acid, alkali, salt and surfactant can be added, and, a stabilizer with intention of inhibiting oxidization and absorbing UV-light, an antibacterial agent and an antiseptic agent can be added. However, these may be added so that the volume resistance value may be in the above range. The viscosity of the dispersion medium, though not particularly restricted, may be in the range of 1 to 100 mPa·s.

As liquids that can be used as the dispersion medium, known water-soluble organic solvents or hydrophobic organic solvents can be used. Examples thereof include hexane, cyclohexane, toluene, xylene, decane, hexadecane, kerosene, paraffin, isoparaffin, silicone oil, modified silicone oil, fluorooil, dichloroethylene, trichloroethylene, perchloroethylene, high-purity petroleum, ethylene glycol, alcohols, ethers, esters, dimethylformamide, dimethylacetamide, dimethyl sulfoxide, N-methylpyrrolidone, 2-pyrrolidone, N-methylfornamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane and the mixtures thereof.

Furthermore, when removing impurities so as to be in the above-mentioned volume resistance value, water (so-called pure water) may be used as well.

Among the liquids exemplified above, hydrophobic organic solvents such as hexane, cyclohexane, kerosene, paraffin and silicone oil, which are decomposed with difficulty even when a voltage is applied, may be used, and particularly silicone oil may be used.

The silicone oil, in comparison with the dispersion medium such as hexane, cyclohexane, kerosene and paraffin, which are so far used in a conventional display medium of an electrophoresis system, has the characteristics in that (1) a dispersion medium is decomposed with difficulty even when a higher voltage is applied, (2) due to high viscosity, when metal particles are electrophoresed, violent convection occurs with difficulty; accordingly, deterioration of the contrast and the disturbance of the display due to violent convection are caused with difficulty, and (3) at the preparation of a display medium, when a dispersion liquid in which metal particles are dispersed is filled under reduced pressure in a space in the display medium where a dispersion medium is to be positioned, the dispersion medium is volatilized with difficulty.

As the silicone oil, known silicone oils can be used without particular restriction. (1) The resistance value may be $10^3$ Ωcm or more, particularly in the range of $10^7$ to $10^{19}$ Ωcm and more particularly in the range of $10^{10}$ to $10^{19}$ Ωcm. (2) The viscosity may be in the range of 1 to 1000 cst and particularly in the range of 1 to 100 cst. Specifically, dimethyl silicone oils such as KF-96 (trade name, manufactured by Shin-Etsu Chemical Co., Ltd.), DOW CORNING 200 (trade name, manufactured by Dow Corning Co.,) and TSF451 (trade name, manufactured by GE/Toshiba Silicone Co., Ltd.) can be used. Furthermore, modified silicone oil (for example KF-393 and X22-3710: trade name, manufactured by Shin-Etsu Silicone Co., Ltd.) where in a part of methyl groups of dimetylpolysiloxane, an organic group is introduced can be used.

-Substrate and Electrode-

As the substrate that is used in a display medium of the exemplary embodiment, films or sheet substrates of polymers such as polyester (for example, polyethylene terephthalate), polyimide, polymethyl methacrylate, polystyrene, polypropylene, polyethylene, polyamide, nylon, polyvinyl chloride, polyvinylidene chloride, polycarbonate, polyether sulfone, silicone resin, polyacetal resin, fluororesin, cellulose derivative and polyolefin and inorganic substrates such as glass substrate, metal substrate or ceramic substrate may be used.

At least one of a pair of substrates that are used in a display medium is a substrate having optical transparency to visible light (transparent substrate). When a light-transmissive display medium is prepared, for both substrates, transparent substrates are used. However, the display medium of the exemplary embodiment fundamentally may be a reflective type. In this case, as one substrate (back substrate) that is disposed facing a transparent substrate, a substrate that does not have optical transparency is used. In a description below, unless stated particularly, a reflective type display medium is presumed and described. However, a display medium of the invention is not restricted only to the reflective type.

In the invention, "having optical transparency" means that the light transmittance to light having a wavelength of a visible region is at least 50% or more, and the light transmittance may be specifically 80% or more and more specifically 100%.

As the transparent substrate, a glass substrate or a transparent resin substrate constituted of an acrylic resin, a polycarbonate resin or a polyethylene terephthalate resin may be used, and a combination thereof can be used as well. Furthermore, as the back substrate, one having same material as that of the transparent substrate may be used. However, an opaque or colored substrate as well can be used. For example, a resin substrate constituted of an ABS resin (acrylonitrile/butadiene/styrene resin) or a glass/epoxy resin can be used.

Furthermore, the substrate may optionally be provided with an electrode. For example, when an electrode is disposed on a surface at a light-modulating layer side of a transparent substrate, an electrode (transparent electrode) that has optical transparency and is constituted of ITO (Indium Tin Oxide) can be used. Still further, when an electrode is disposed on a surface at a light-modulating layer side of the back substrate, a transparent electrode constituted of a transparent conductive material such as ITO may be used. However, an electrode constituted of a metal such as copper may be disposed.

The electrodes may be disposed in so-called row and column so that an electrode at a transparent substrate side and an electrode at a back substrate side may intersect orthogonally by disposing in strips on a substrate surface. Furthermore, when an electrode is disposed on a surface at a light-modulating layer side of the back substrate, in order to protect the electrode, an insulating film constituted of a resin or an inorganic material may be disposed so as to cover the electrode surface.

On the substrate, a wiring, a thin film transistor, a diode having a metal/insulating layer/metal structure, a variable capacitor and a driving switch element such as a ferroelectric material may optionally be formed.

-Other Materials-

In a display medium, in order to inhibit contents such as a dispersion medium from leaking from the display medium or in order to partition with partition walls a light-modulating layer constituted of a dispersion medium and the like positioned between a pair of substrates into a plurality of cells, a partition wall is disposed between a pair of substrates.

A height of the partition wall, without particularly restricted, is usually in the range of substantially 20 µm to 1 mm. Furthermore, a width of the partition wall, though not particularly restricted, is advantageously smaller from the viewpoint of the resolution of the display medium, and usually in the range of substantially 10 µm to 1 mm.

Furthermore, a material of the partition wall, as far as it is a material having an insulating property and insoluble in a dispersion medium, is not particularly restricted. For example, a known photosensitive resin or rubber can be used.

In the exemplary embodiment, the "insulating property" means that the volume resistivity is $10^6$ Ωcm or more. Furthermore, a "conductive property" means that the volume resistivity is $10^{-3}$ Ωcm or less.

In addition, at the time of preparing a display medium, in order to adhere a partition wall and a substrate, an adhesive can be used. The adhesive is not particularly restricted. A thermosetting resin or a UV-curable resin can be used. However, a material that does not affect on a material of the partition wall or a material that constitutes a light-modulating layer is selected.

Furthermore, in order to maintain a gap width between a pair of substrates constant, optionally, a rib may be disposed or particles having a size same as the gap width of the pair of substrates may be disposed.

-Method of Producing Display Medium-

A method of producing a display medium is not particularly restricted. However, it may be produced according to, for example, a process below. In the beginning, as a pair of substrates, a transparent substrate and a back substrate are prepared. The substrates may be previously provided with an electrode. Subsequently, partition walls are formed on a surface at a light-modulating layer side of any one of the transparent substrate and the back substrate, followed by adhering both substrates to each other. When the substrates are adhered, electrophoretic particle holder such as electrophoretic particle holding particles are filled between a pair of substrates. In the next place, from an injection port of a dispersion medium, which is provided in advance at the time of forming partition walls, a dispersion medium containing one or more kinds of electrophoretic particle are injected, followed by sealing the injection port to obtain a display medium.

-Display Device-

In the next place, a display device that uses a display medium of the above-described exemplary embodiment will be described. A display device of the invention includes the display medium of the invention which includes a pair of electrodes at positions capable of applying an electric field to a dispersion medium positioned between a pair of substrates, and further includes an electric field applicator that is connected to the pair of electrodes and applies an electric field to the dispersion medium. Here, the pair of electrodes is disposed at one substrate side of a pair of substrates and at the other substrate side thereof.

For example, when on a surface at a transparent substrate side of a back substrate a back electrode is disposed and on a surface at an opposite side to a display surface of a transparent substrate a transparent electrode is disposed, an electric field applicator is connected to the pair of electrodes. Thereby, when a display is carried out, without using an electric field applicator outside of the display medium, the display can be carried out.

The electric field applicator that is used in the display device, as far as it is provided with a control function by which a voltage waveform of an applied electric field and an electric field application period thereof can be controlled so as to enable to display a halftone, is not particularly restricted. However, usually, an electric field applicator that can apply an electric field having a voltage waveform that satisfies the formula (5) to a dispersion medium is used, and one that can apply an electric field having a voltage waveform that satisfies the formula (7) or (8) to a dispersion medium may be used. Accordingly, as an electric field applicator, for example, an electric field applicator that includes a control circuit or is provided with a program, which can control so that a voltage waveform of an electric field applied may satisfy the formula (5), (7) or (8), can be used.

Furthermore, as the electric field applicator, any one of an AC power source and a DC power source may be used, and, when an AC voltage and a DC voltage are applied simultaneously through electrodes to the light-modulating layer, both can be used together.

-Specific Example of Display Medium (Display Device)-

In what follows, specific examples of display devices will be described with reference to the drawings. However, the display medium of the exemplary embodiment is not restricted only to examples described below.

Figure 8:
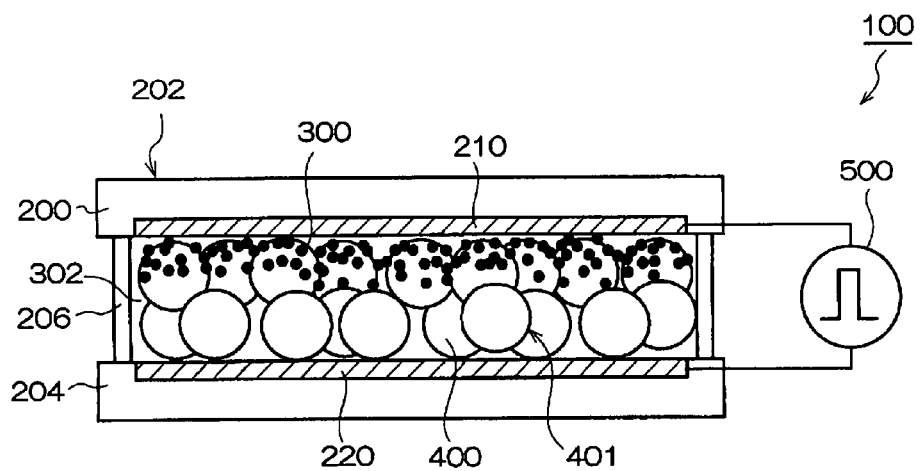
FIG. 8 is a schematic diagram showing an example of a display medium of an exemplary embodiment.

FIG. 8 is a schematic diagram showing an example of a display medium of the exemplary embodiment. In the drawing, reference numeral 100 denotes a display medium; reference numeral 200, a transparent substrate; reference numeral 202, a display surface; reference numeral 204, a back substrate; reference numeral 206, a partition wall; reference numeral 210, a transparent electrode; reference numeral 220, a back electrode; reference numeral 300, an electrophoretic particle; reference numeral 302, a dispersion medium; reference numeral 401, an electrophoretic particle holder; reference numeral 400, an electrophoretic particle holding particle; and reference numeral 500, an electric field applicator.

A display medium 100 shown in FIG. 8 includes: a transparent substrate 200 one surface of which constitutes a display surface 202 and the other surface of which is provided with a transparent electrode 210; a back substrate 204 that is disposed facing a surface of the transparent substrate 200 on which the transparent electrode 210 is disposed and that is provided with a back electrode 220 on the transparent substrate 200 side thereof; a partition wall 206 that is disposed at an end portion of a gap between the transparent substrate 200 and the back substrate 204 so as to seal the gap portion; a dispersion medium 302 containing electrophoretic particles 300 positioned in a gap between the transparent substrate 200 and the back substrate 204; and electrophoretic particle holder 401 disposed between a pair of transparent substrates 200 and 204.

Here, a region surrounded by a pair of transparent substrates 200 and 204 and a partition wall 206 corresponds to a light-modulating layer. Furthermore, a transparent electrode 210 and a back electrode 220 of the display medium 100 are connected to an electric field applicator 500 so that an electric field may be applied to a dispersion medium 302; and for example, an electric field having a rectangular voltage waveform (so-called pulse wave) that satisfies the formula (7) or (8) can be applied. Furthermore, an electrophoretic particle holder 401 is composed of an aggregate of a plurality of electrophoretic particle holding particles 400 and filled and disposed between a pair of substrates 200 and 204 to an extent where the plurality of electrophoretic particle holding particles 400 cannot move to each other.

In the next place, an example of an operation of a display medium 100 will be described of a case where electrophoretic particle holding particles 400 are white and charged negative and electrophoretic particles 300 are red and charged positive.

In the beginning, as shown in FIG. 8, in a case where the electrophoretic particles 300 are localized on a surface of the electrophoretic particle holding particles 400 present at a transparent substrate 200 side, at a side that faces the transparent substrate 200, when the display medium 100 is observed from a display surface 202 side, a deep red color (at the maximum density or similar density to that) is observed.

Here, with the transparent electrode 210 set minus and the back electrode 220 set plus, an electric field is applied for a sufficient time so that the maximum density may be completely obtained, and a state where the electric field has been applied is taken as an initial state.

While the electric field is being applied, electrophoretic particles 300 are attracted toward a surface of the transparent electrode 210. However, when the electric field is removed, the electrophoretic particles 300 become readily detachable from a surface of the transparent electrode 210. However, the electrophoretic particles 300, even after detached from a surface of the transparent electrode 210, are stuck and held on a surface (surface at a transparent electrode 210 side) of the electrophoretic particle holding particle 400 neighboring to a surface of the transparent electrode 210; accordingly, the display density after the electric field is removed can be stably sustained over time.

In the next place, when, from the initial state, an electric field having a pulse voltage waveform is applied so as to satisfy, for example, the formula (8) and so that an integer n of the formula (8) may be 3, a four-level display of deep red (maximum density), slightly deep red, slightly thin red and white (minimum density) can be realized.

Furthermore, even when a state where an electric field is removed is sustained after a gradation of any one of levels is displayed, the electrophoretic particles 300 continue to be stuck and held at the same positions of a surface of the electrophoretic particle holding particle 400 as that immediately after the electric field is removed; accordingly, the display density does not vary over time.

In the next place, an example of a display medium where as an electrophoretic particle holder an electrophoretic particle holder constituted of a porous body or a network structure is used will be described.

Figure 9:
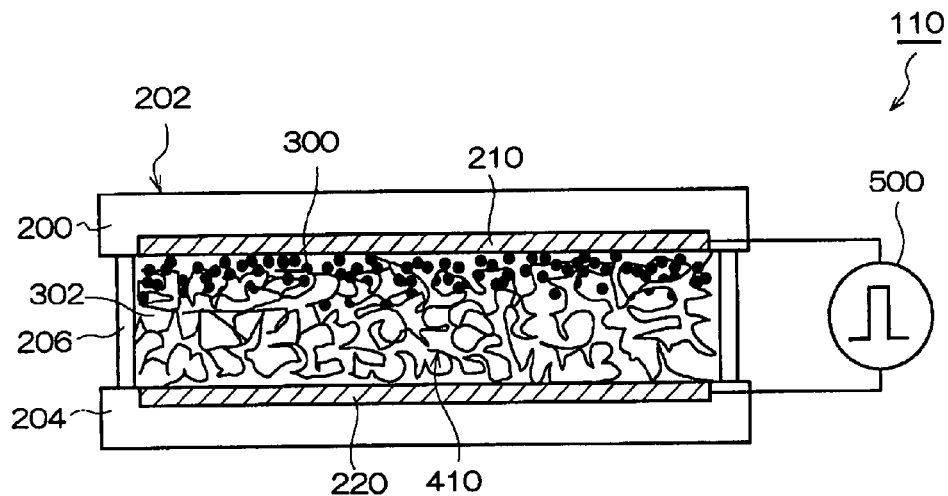
FIG. 9 is a schematic diagram showing another example of a display medium of an exemplary embodiment.

FIG. 9 is a schematic diagram showing another example of a display medium of the exemplary embodiment, and, in the drawing, a reference numeral 110 denotes a display medium, a reference numeral 410 denotes, in place of the electrophoretic particle holder 401 constituted of an aggregate of the electrophoretic particle holding particles 400 shown in FIG. 8, an electrophoretic particle holder 410 constituted of an aggregate of porous bodies, network structures or fibers, and members represented by other reference numerals have same functions as that shown in FIG. 8.

The display medium 110 shown in FIG. 9 fundamentally has a configuration similar to the display medium 100 shown in FIG. 8. However, it is different from the display medium 100 in a point that, as the electrophoretic particle holder, an electrophoretic particle holder 410 constituted of a porous body, network structures or an aggregate of fibers is used. The electrophoretic particle holder 410 constituted of porous bodies, network structures or aggregates of fibers are filled and disposed between a pair of substrates 200 and 204 so as not to be able to move in a light-modulating layer. As to the display medium 110 as well, a display similar to that of the display medium 100 shown in FIG. 8 can be carried out.

The electrophoretic particle holder 410 constituted of porous bodies, network structures or aggregates of fibers filled and disposed between a pair of substrates 200 and 204 of a display medium 110, as shown in FIG. 9, may be disposed so that a holding function of the electrophoretic particles 300 in a direction in which the pair of substrates 200 and 204 face each other may be uniform. However, the electrophoretic particle holder 410 may be disposed so that a holding function of the electrophoretic particles 300 in a direction in which the pair of substrates 200 and 204 face each other may decrease continuously or stepwise as a distance from at least one of the transparent substrate 200 and the back substrate 204 increases.

When the electrophoretic particle holder 410 constituted of the porous bodies, network structures or aggregates of fibers is filled and disposed between substrates 200 and 204 of a display medium 110, in comparison with a case where the electrophoretic particle holder is constituted of an aggregate of the electrophoretic particle holding particles 400, the air permeability, aperture, inter-fiber distance and pore density can be readily adjusted. Furthermore, the electrophoretic particle holder can be constituted as a continuous body as a continuous member, and, thereby, the function of holding the electrophoretic particles 300 of the electrophoretic particle holder may be partially adjusted.

Figure 21:
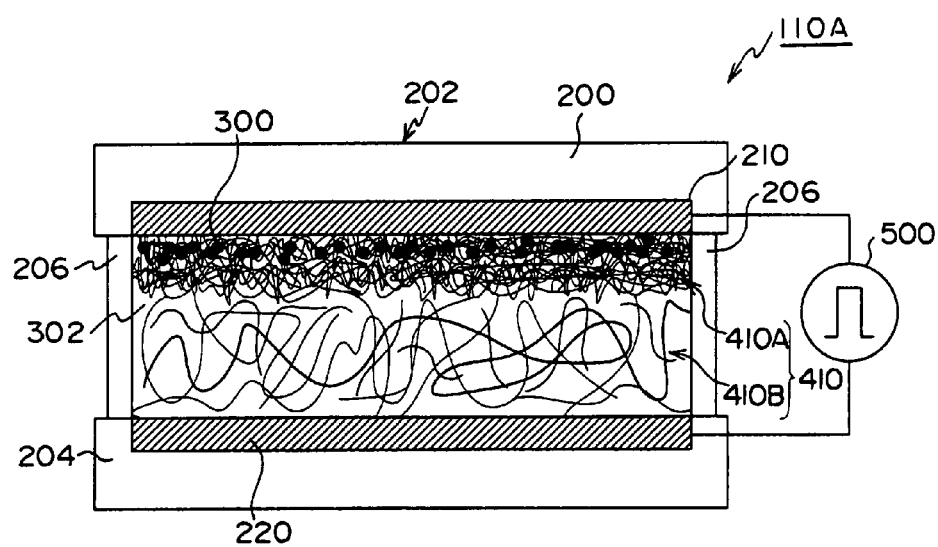
FIG. 21 is a schematic diagram showing another example of the display medium shown in FIG. 9.

Specifically, as shown in FIG. 21, the electrophoretic particle holder 410 may be filled and disposed so that, among the electrophoretic particle holder 410 filled and disposed between the transparent substrate 200 and the back substrate 204, the electrophoretic particle holder 410A disposed at a transparent substrate 200 side may have a larger holding function of the electrophoretic particles 300, and the electrophoretic particle holder 410B disposed in a region far from the transparent substrate 200, that is, at a back substrate 204 side may have a smaller holding function of the electrophoretic particles 300 than that in a region close to the transparent substrate 200.

Figure 22:
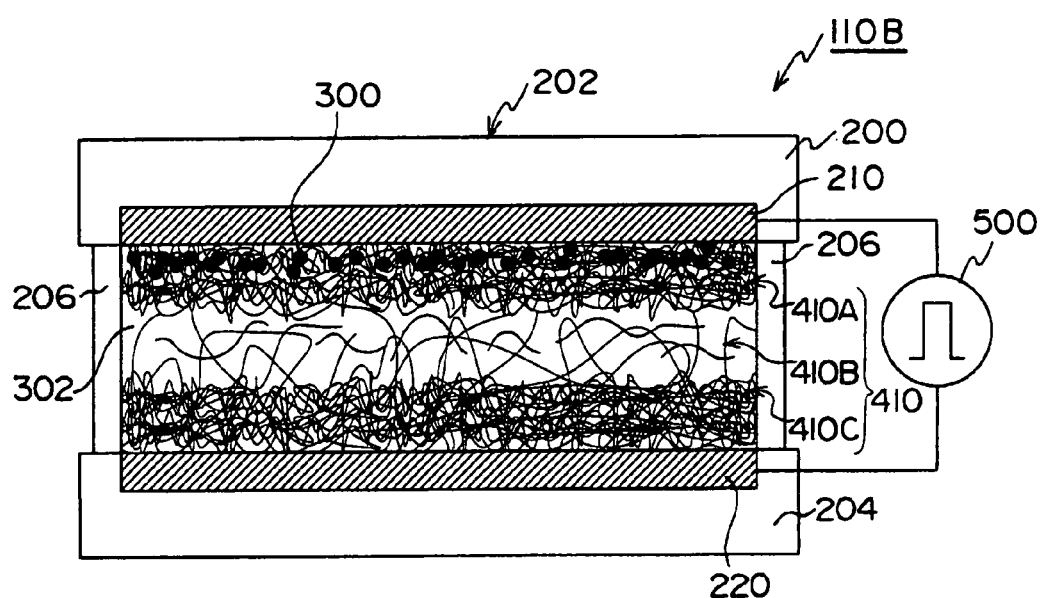
FIG. 22 is a schematic diagram showing another example of the display medium shown in FIG. 9.

Furthermore, as shown in FIG. 22, the display medium may be constituted in such a manner that, among the electrophoretic particle holder 410 filled and disposed between the transparent substrate 200 and the back substrate 204, electrophoretic particle holder 410A disposed in a region close to the transparent substrate 200 and electrophoretic particle holder 410C disposed in a region close to the back substrate 204 may have a larger holding function of the electrophoretic particles 300, and electrophoretic particle holder 410B smaller in the holding function of the electrophoretic particles 300 than that of the electrophoretic particle holder 410A and the electrophoretic particle holder 410C may be filled and disposed in a region between the electrophoretic particle holder 410A and the electrophoretic particle holder 410C so that the holding function of the electrophoretic particles 300 may decrease as a distance from each of the transparent substrate 200 and the back substrate 204 increases in a direction where the substrates face each other.

In order to continuously or stepwise vary the holding function of the electrophoretic particles 300 of the electrophoretic particle holder 410 in a direction where the transparent substrate 200 and the back substrate 204 face each other, as described above, the charging amount, air permeability, aperture, pore density and inter-fiber distance of the electrophoretic particle holder 410 may be adjusted.

When, as shown in FIG. 22, among the electrophoretic particle holder 410 filled and disposed between the transparent substrate 200 and the back substrate 204, the holding functions of the electrophoretic particles 300 of the electrophoretic particle holder 410A constituting a region close to the transparent substrate 200 and the electrophoretic particle holder 410C constituting a region close to the back substrate 204, respectively, are adjusted to be larger than the holding function of the electrophoretic particles 300 of the electrophoretic particle holder 410B constituting a region between the electrophoretic particle holder 410A and the electrophoretic particle holder 410C of the electrophoretic particle holder 410, only the electrophoretic particle holder 410B disposed therebetween may be a colored layer. In this case, a color of the electrophoretic particle holder 410B may be white.

In order to make the color of the electrophoretic particle holder 410B white, a white material may be fixed on a surface of a fiber or a member that constitutes the electrophoretic particle holder 410B. As the white material, white pigments such as titanium oxide, barium titanate, barium sulfate and calcium carbonate can be used. As the white material, a particulate white particle can be used.

The display medium 110, display medium 110A and display medium 110B in which the electrophoretic particle holder 410 constituted of porous bodies, network structures or aggregates of fibers are filled and disposed between the transparent substrate 200 and back substrate 204 may be manufactured in a process wherein the electrophoretic particle holder 410 constituted of the porous bodies, network structures or aggregates of fibers are impregnated with the dispersion medium 302 and the electrophoretic particles 300, and the resulting product is sandwiched between the transparent substrate 200 and back substrate 204. Accordingly, the display medium 110, display medium 110A and display medium 110B can be readily prepared.

In all of the display media exemplified above, a case where one kind of color forming electrophoretic particles is contained in one cell obtained by dividing a dispersion medium positioned between a pair of substrates with a partition wall is shown. However, two or more kinds of color forming electrophoretic particles may be contained in one cell. A configuration example of this type display medium will be described below.

Figure 10:
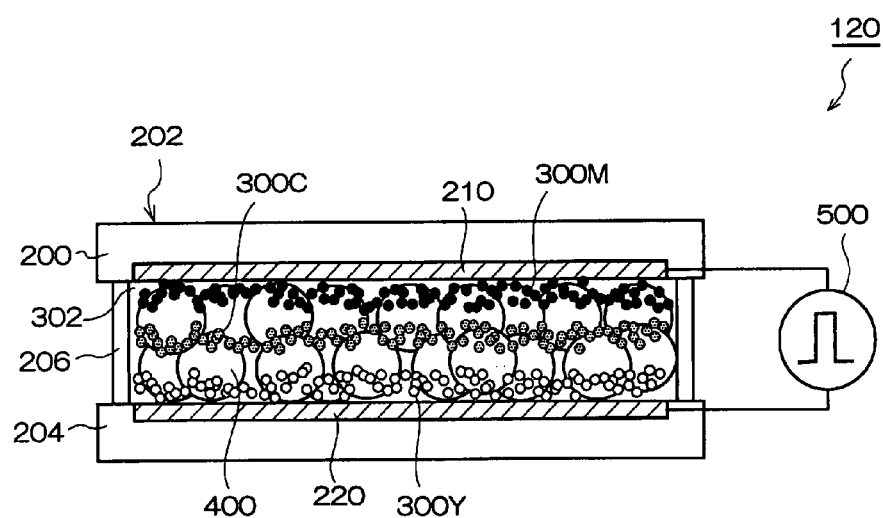
FIG. 10 is a schematic diagram showing another example of a display medium of an exemplary embodiment.

FIG. 10 is a schematic diagram showing another example of a display medium of the exemplary embodiment. In the drawing, reference numerals 120 denotes a display medium, reference numerals 300C, 300M and 300Y denote electrophoretic particles and members shown with other reference numerals have functions same as those shown in FIG. 8.

The display medium 120 shown in FIG. 10, though having a configuration fundamentally same as that of the display medium 100 shown in FIG. 8, is different in that in the display medium 100 shown in FIG. 8, not one kind, but three kinds of electrophoretic particles 300C, 300M and 300Y are used.

As the three kinds of electrophoretic particles 300C, 300M and 300Y, ones that are charged with the same polarity, form colors different from each other when these dispersed in the dispersion medium 302, and are different in absolute values of the threshold electric field values capable of detaching from a surface of the electrophoretic particle holder 400 and moving in the dispersion medium 302 are used.

In a description below, the electrophoretic particle 300C is constituted of a cyan colored electrophoretic particle, the electrophoretic particle 300M is constituted of a magenta colored electrophoretic particle and the electrophoretic particle 300Y is constituted of a yellow colored electrophoretic particle, all of which being charged positive.

Figure 11:
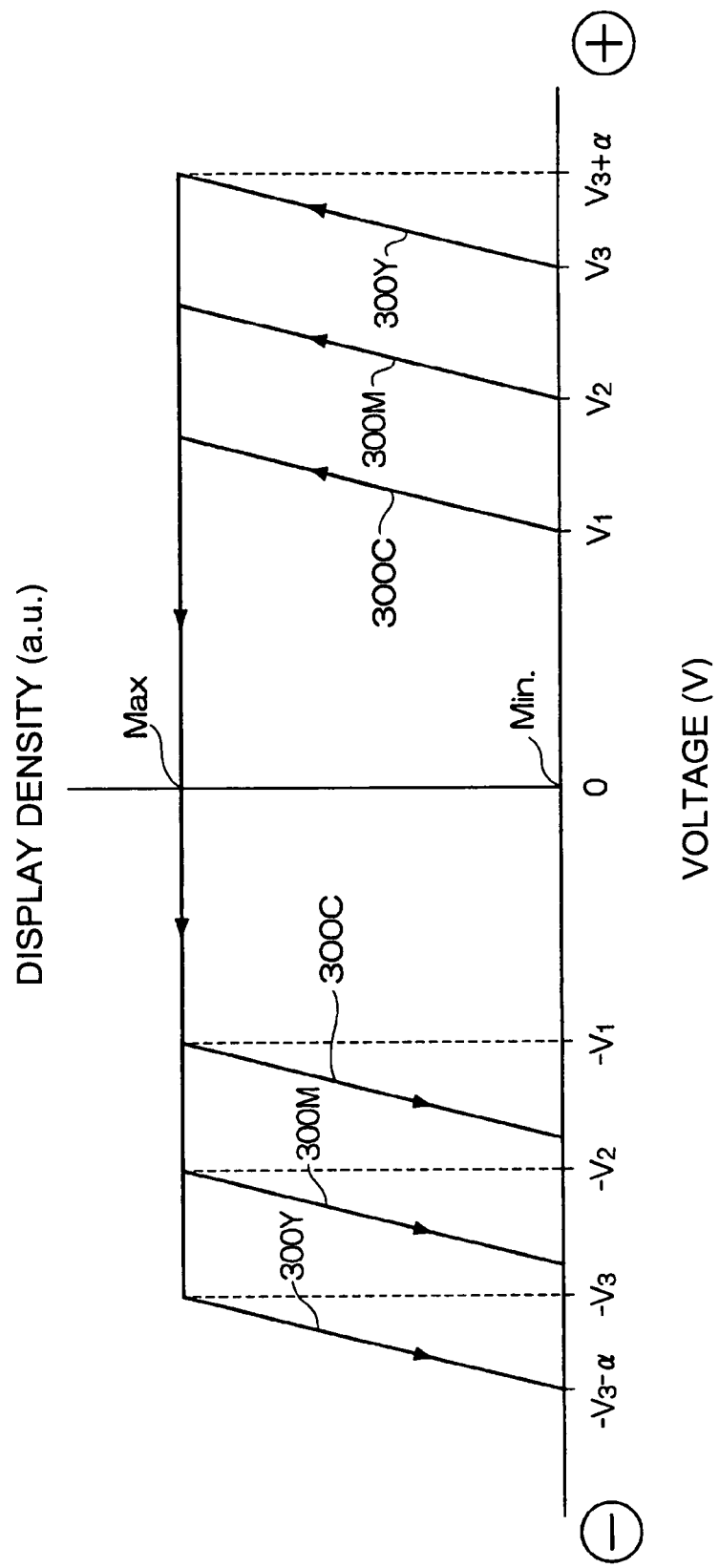
FIG. 11 is a graph explaining relationship between threshold voltages of three kinds of electrophoretic particles used in a display medium shown in FIG. 10 and display densities thereof.

Here, the threshold electric field values of the three kinds of the electrophoretic particles 300C, 300M and 300Y can be set as shown in FIG. 11 for example.

FIG. 11 is a graph describing relationship between the threshold voltages of three kinds of electrophoretic particles that are used in the display medium shown in FIG. 10 and display densities thereof. In the drawing, a "voltage" shown in a horizontal axis means a voltage (V) of an electric field applied between a transparent electrode 210 and a back electrode 220 and is plus (rightward direction in the graph) when a voltage is applied so that a back electrode 220 side may be a positive electrode and a transparent electrode 210 side may be a negative electrode. The "display density" shown in a vertical axis means a color density (relative density) shown on a display surface 202 when the three kinds of electrophoretic particles 300C, 300M and 300Y, respectively, are assumed to be used singly, and a state where the electrophoretic particles move toward the transparent substrate 200 and the display density becomes larger means an upward direction of the graph. Furthermore, V1, V2 and V3 mean threshold voltages. Since a distance between the transparent electrode 210 and the back electrode 220 is constant, the threshold value of an electric field and the threshold voltage are proportionate.

As apparent from FIG. 11, when the electrophoretic particle 300C is taken as an example for description, when a plus electric field is applied to a dispersion medium 302, an intensity thereof is continuously increased in a plus side, and a voltage becomes threshold voltage V1 or higher, the electrophoretic particle 300C moves from a back substrate 204 side to a transparent substrate 200 side, so that the display density of a cyan color becomes deeper, and the display density of the cyan color saturates before the voltage reaches V2. When, in this state, a minus electric field is applied to the dispersion medium, an intensity thereof is continuously increased in a minus side, and a voltage becomes threshold voltage −V1 or lower, the electrophoretic particle 300C moves from a transparent substrate 200 side to a back substrate 204 side, so that the display density of a cyan color becomes thinner, and the display density of the cyan color becomes minimum before the voltage reaches −V2.

Similarly to the above, in the case of the electrophoretic particle 300M, when a voltage becomes a threshold voltage V2 or higher (or −V2 or lower), the display density increases (or decreases), and, before the voltage reaches V3 (or −V3), the display density saturates (or becomes minimum). In the case of electrophoretic particle 300Y, when a voltage is a threshold voltage V3 or higher (or −V3 or lower), the display density increases (or decreases), and, when the voltage reaches V3+α(or −V3−α), the display density saturates (or becomes minimum).

Furthermore, as shown in FIG. 11, absolute values of the threshold voltages of the three kinds of electrophoretic particles 300C, 300M and 300Y satisfy relationship of |V1|<|V2|<|V3|. Accordingly, when a voltage is applied using the differences of the absolute values of the threshold voltages of the respective electrophoretic particles 300C, 300M and 300Y, in one cell, in addition to white color (W), cyan color (C), magenta color (M), yellow color (Y) and second or third colors of CMY can be displayed.

A method of controlling a threshold voltage is not particularly restricted. However, for example, a method where in order that the adherence to a white electrophoretic particle holding particle 400 of each of the three kinds of electrophoretic particles 300C, 300M and 300Y may be differentiated from each other, average particle diameters of the electrophoretic particles 300C, 300M and 300Y, a surface treatment state of particle and a charge control agent applied to a particle surface are selected can be exemplified.

For example, in the case of materials constituting electrophoretic particles 300C, 300M and 300Y and the charging characteristics due to a surface treatment state of particles being assumed substantially same, when average particle diameters of the three kinds of electrophoretic particles 300C, 300M and 300Y are differentiated, the absolute values of the threshold voltages for each of the electrophoretic particles 300C, 300M and 300Y can be set.

In this case, in order that the absolute values of the threshold voltages may satisfy the relationship of |V1|<|V2|<|V3|, the respective average particle diameters Dc, Dm and Dy of the electrophoretic particles 300C, 300M and 300Y may satisfy the relationship of Dc>Dm>Dy, for example, Dc=500 nm, Dm=150 nm and Dy=50 nm.

In the invention, the threshold voltage exemplified in FIG. 11 can be readily determined from a gap length of a pair of electrodes used to apply an electric field (a gap length between a transparent electrode 210 and a back electrode 220 in an example shown in FIG. 10) and a voltage at which the display density of a particular color (cyan, magenta and yellow in an example shown in FIG. 10) starts varying when a voltage applied to the pair of electrodes are varied and a color displayed on a display medium is observed.

A method where, in the beginning, an electric field is stopped in a state where particles are drawn toward an electrode at one side, and then the electric field is applied in an opposite direction to observe whether or not the particles move can be used to measure. For example, when, by use of a reflection densitometer, a display density is measured to obtain the relationship between an applied voltage and the display density, the threshold voltage can be obtained as a voltage value where the density begins varying.

Alternatively, an apparatus in which with a pair of parallel planar electrodes dipped in a transparent vessel, a space between electrodes can be observed from a direction vertical to a parallel electric field is prepared. For example, when the particles are positively charged, with one electrode set to the negative polarity, the particles are moved toward the electrode side. In this state, an electric field is shut down, and with the electrode at a side where the particles are collected set to the positive polarity, a voltage is gradually increased. At this time, a voltage V at which the particles starts moving toward the electrode at a negative side is obtained, followed by dividing by a distance between electrodes, whereby a threshold value of the electric field can be obtained.

In all cases, in the case where electrophoresed particles do not have a threshold voltage, when the electric field is set 0 or a voltage is made smaller, the electrophoretic particles collected on an electrode surface start moving, and, without applying an electric field of inverse polarity, instantaneously, the display density starts varying. On the other hand, in the case where the electrophoretic particles have a threshold value, only by weakening or removing the electric field, the electrophoretic particles once collected on the electrode do not move in a liquid or toward an electrode at an opposite side, that is, the display density does not vary.

In the next place, under the premises that three kinds of electrophoretic particles 300C, 300M and 300Y satisfy the relationship shown in FIG. 11, an example of a display operation of a display medium 120 will be described below.

FIGS. 12 through 20 are schematic diagrams showing an example of a display state in a display medium shown in FIG. 10. In the drawings, although an electric field applicator 500 is omitted from describing, a pair of electrodes 210 and 220 are connected to the electric field applicator 500 (FIG. 10).

Figure 12:
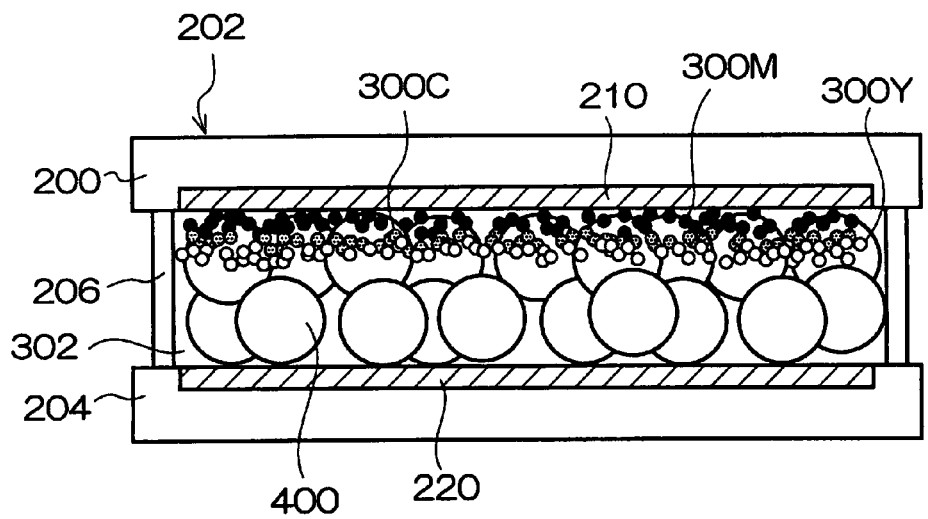
FIG. 12 is a schematic diagram showing an example of a display state in the display medium shown in FIG. 10.

In the beginning, when a voltage is applied so that a voltage may be V3+α until a display density is saturated, electrophoretic particles 300C, 300M and 300Y move toward a transparent substrate 200 side to display a black color on a display surface 202 due to subtractive color mixing of yellow, magenta and cyan (FIG. 12).

Although, when an electric field is being applied, the electrophoretic particles 300C, 300M and 300Y are drawn toward a surface of the transparent electrode 210, when the electric field is removed, the electrophoretic particles 300C, 300M and 300Y tend to be readily detached from a surface of the transparent electrode 210. However, the electrophoretic particles 300C, 300M and 300Y, even when detached from a surface of the transparent electrode 210, are stuck and held on a surface of the electrophoretic particle holding particle 400 near a surface of the transparent electrode 210 (a surface at a transparent electrode 210 side); accordingly, a display density after the electric field is removed is stably maintained over time.

Figure 13:
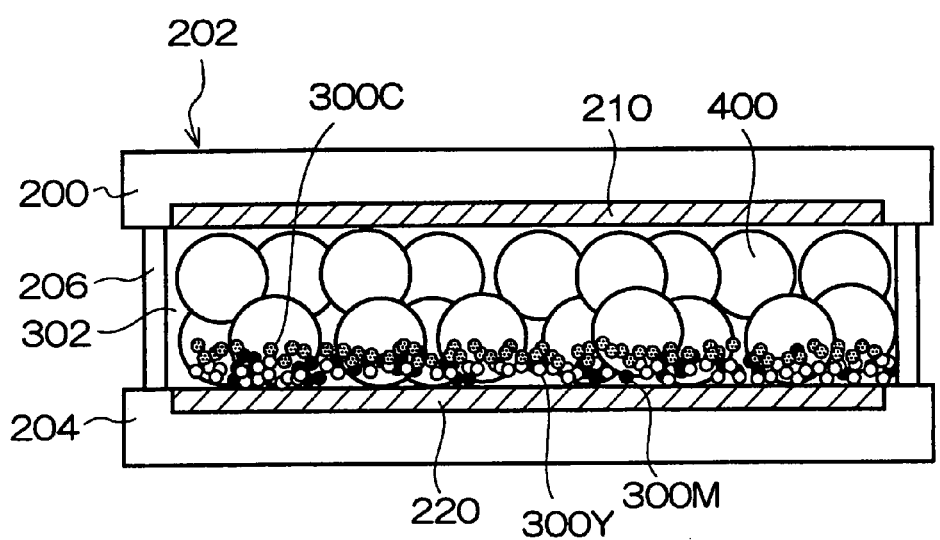
FIG. 13 is a schematic diagram showing another example of a display state in the display medium shown in FIG. 10.

Subsequently, when a voltage is applied so that a voltage may be $-V3-\alpha$ until a display density is saturated, the electrophoretic particles 300C, 300M and 300Y move toward a back substrate 204 side. The three kinds of particles, when observed from a display surface 202 side, are hidden by the electrophoretic particle holding particle 400; accordingly, a white color is displayed on a display surface 202 (FIG. 13).

While an electric field is being applied, the electrophoretic particles 300C, 300M and 300Y are drawn toward a surface of the back electrode 220. However, when the electric field is removed, these particles tend to be readily detached from a surface of the back electrode 220. However, the electrophoretic particles 300C, 300M and 300Y, even when detached from a surface of the back electrode 220, are stuck and held on a surface of the electrophoretic particle holding particle 400 near a surface of the back electrode 220 (a surface at a back electrode 220 side); accordingly, a display density after the electric field is removed is stably maintained over time.

In the next place, for example, under the premise that an electric field having a pulse voltage waveform where the formula (8) is satisfied, an integer n in the formula (8) is set at 2 and time Tp(1)=Tp(2)=Tmax/2=Th is applied to display, a description will be given.

In this case, with respect to each of the electrophoretic particles 300C, 300M and 300Y, three-level display can be realized.

That is, with respect to each of the electrophoretic particles 300C, 300M and 300Y, a state where the electrophoretic particles are localized at one substrate side is taken as a first initial state (for example, the maximum density). When a voltage capable of electrophoresing the electrophoretic particles from the first initial state to the other substrate side has been applied only for a time Th, the electrophoretic particles are localized in the neighborhood of a center portion in a thickness direction of a light-modulating layer to form an intermediate density, and then, when a voltage capable of electrophoresing the electrophoretic particles toward the other substrate side has been applied only for a time Th, a second initial state (for example, the minimum density) is obtained. Furthermore, when a voltage capable of electrophoresing the electrophoretic particles from the first initial state to the other substrate side has been applied for a time 2Th (Tmax), a second initial state is obtained.

Here, when from a display state (white display) shown in FIG. 13, a voltage equal to or higher than V2 but less than V3 is applied for a time 2Th (or longer), the electrophoretic particles 300C and 300M move toward the transparent substrate 200 side. At this time, since, with respect to the electrophoretic particles 300Y, the adherence force with the electrophoretic particle holding particle 400 is larger than a force received from the electric field, the electrophoretic particles 300Y remain stuck and held on a surface of the electrophoretic particle holding particle 400. Accordingly, a blue color is displayed on a display surface 202 (FIG. 14).

Figure 14:
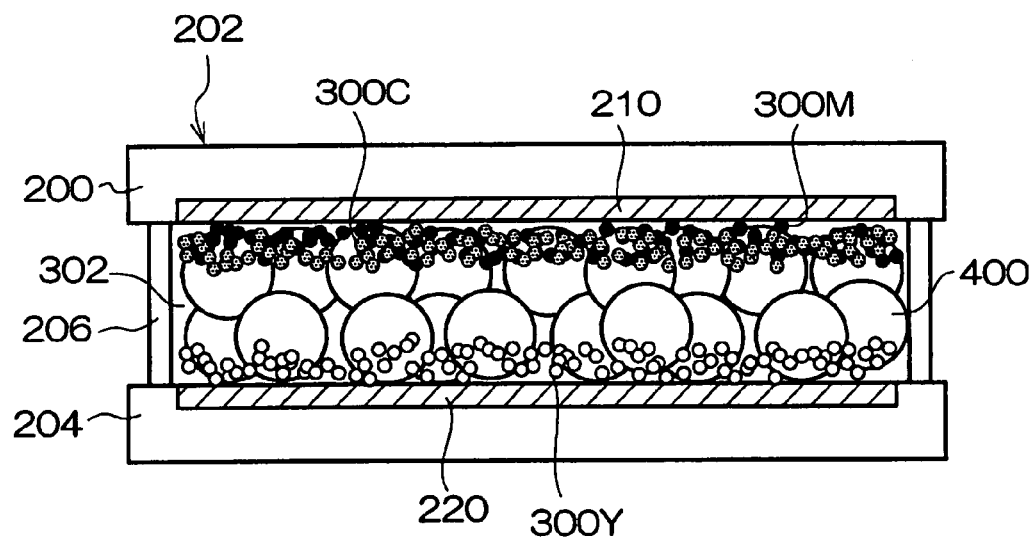
FIG. 14 is a schematic diagram showing another example of a display state in the display medium shown in FIG. 10.
Figure 15:
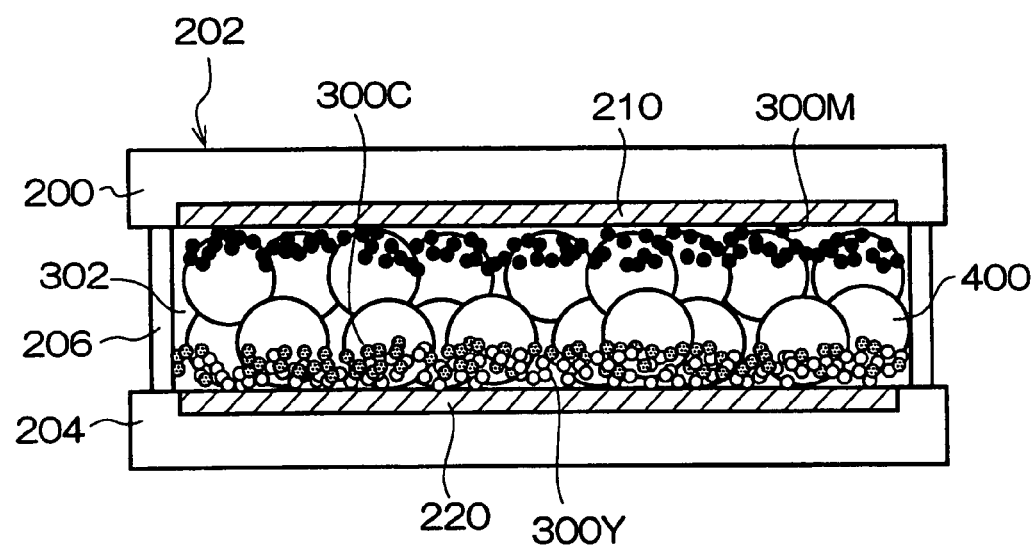
FIG. 15 is a schematic diagram showing another example of a display state in the display medium shown in FIG. 10.

In the next place, when, from a display state shown in FIG. 14, a voltage equal to or less than −V1 but exceeding −V2 is applied only for a time 2Th (or longer), only the electrophoretic particles 300C are detached from a surface of the electrophoretic particle holding particle 400 and move toward the back substrate 204 side. However, since the adherence force with the electrophoretic particle holding particle 400 is larger than a force receiving from an electric field, the electrophoretic particles 300M and 300Y are still held and stuck on a surface of the electrophoretic particle holding particle 400. Accordingly, only the electrophoretic particles 300M are localized at the transparent substrate 200 side, and a magenta color is displayed on a display surface 202 (FIG. 15).

Furthermore, when, from a display state (white display) shown in FIG. 13, a voltage equal to or higher than V2 but less than V3 is applied only for a time Th, the electrophoretic particles 300C and 300M move from the back substrate 204 side to the transparent substrate 200 side, and at a time point when the electric field has been applied, the electrophoretic particles 300C and 300M are stuck and held on the surface of the electrophoretic particle holding particle 400 so as to be localized in the neighborhood of a center portion in a thickness direction of a light-modulating layer. Accordingly, a pale blue color is displayed on a display surface 202 (FIG. 16).

Figure 16:
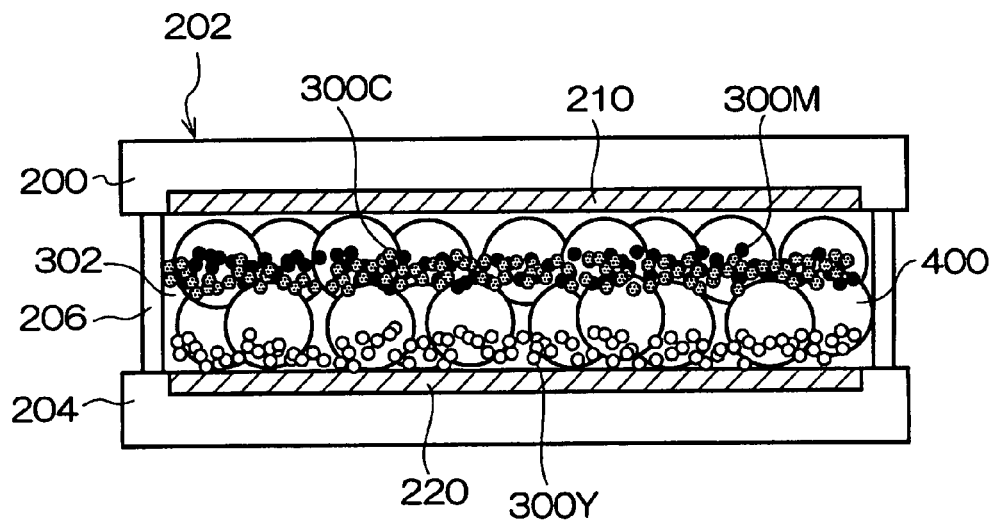
FIG. 16 is a schematic diagram showing another example of a display state in the display medium shown in FIG. 10.
Figure 17:
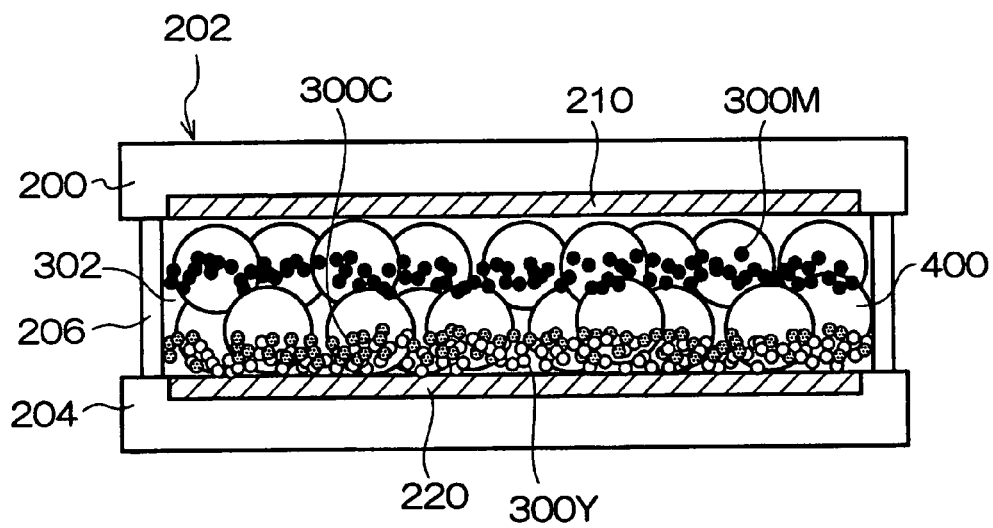
FIG. 17 is a schematic diagram showing another example of a display state in the display medium shown in FIG. 10.

In the next place, when, from a display state shown in FIG. 16, a voltage equal to or less than −V1 but exceeding −V2 is applied only for a time Th, only the electrophoretic particles 300C are detached from a surface of the electrophoretic particle holding particle 400 and move toward the back substrate 204 side, and only the electrophoretic particles 300M continue to be held as it is on a surface of the electrophoretic particle holding particle 400 so as to be localized in the neighborhood of a center portion in a thickness direction of a light-modulating layer. Accordingly, a thin magenta color is displayed on a display surface 202 (FIG. 17).

Furthermore, when, from a display state (black display) shown in FIG. 12, a voltage equal to or lower than −V2 but exceeding −V3 is applied only for a time 2Th (or longer), the electrophoretic particles 300C and 300M move from the transparent substrate 200 side to the back substrate 204 side, and, at a time point when an electric field has been applied, the electrophoretic particles 300C and 300M are localized at the back substrate 204 side and only the electrophoretic particles 300Y continue to be localized at the transparent substrate 200 side similarly to before the application of an electric field. Accordingly, a yellow color is displayed on a display surface 202 (FIG. 18).

Figure 18:
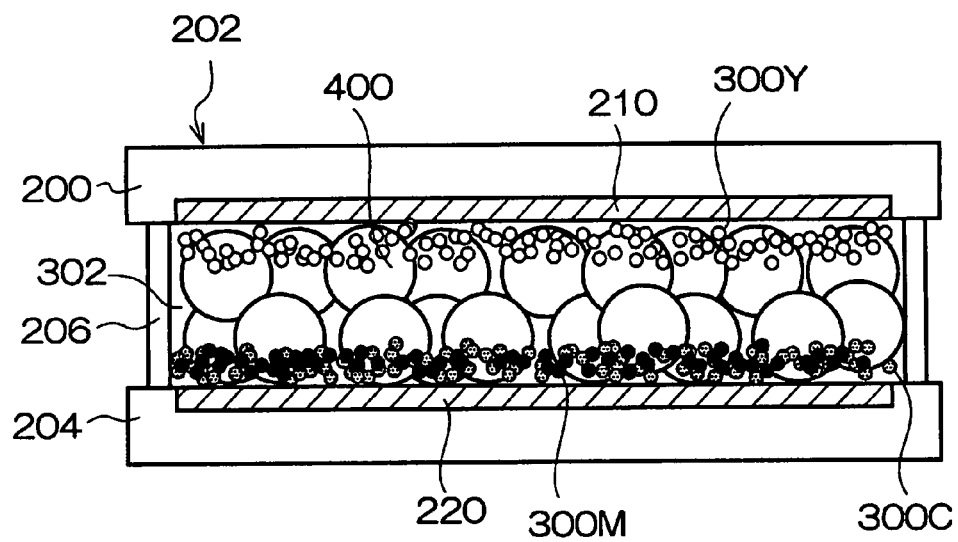
FIG. 18 is a schematic diagram showing another example of a display state in the display medium shown in FIG. 10.

In the next place, when, from a display state shown in FIG. 18, a voltage equal to or higher than V1 but less than V2 is applied only for a time 2Th (or longer), the electrophoretic particles 300C move from a back substrate 204 side to a transparent substrate 200 side, and, at a time point when an electric field has been applied, the electrophoretic particles 300C are localized at the transparent substrate 200 side.

Figure 19:
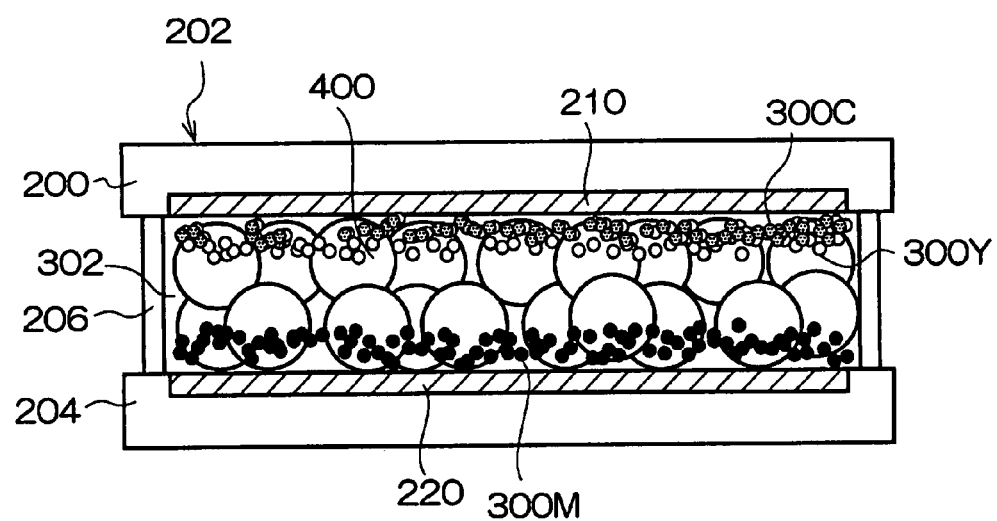
FIG. 19 is a schematic diagram showing another example of a display state in the display medium shown in FIG. 10.

Accordingly, a green color is displayed on a display surface 202 due to the subtractive color mixing of yellow and cyan (FIG. 19).

Figure 20:
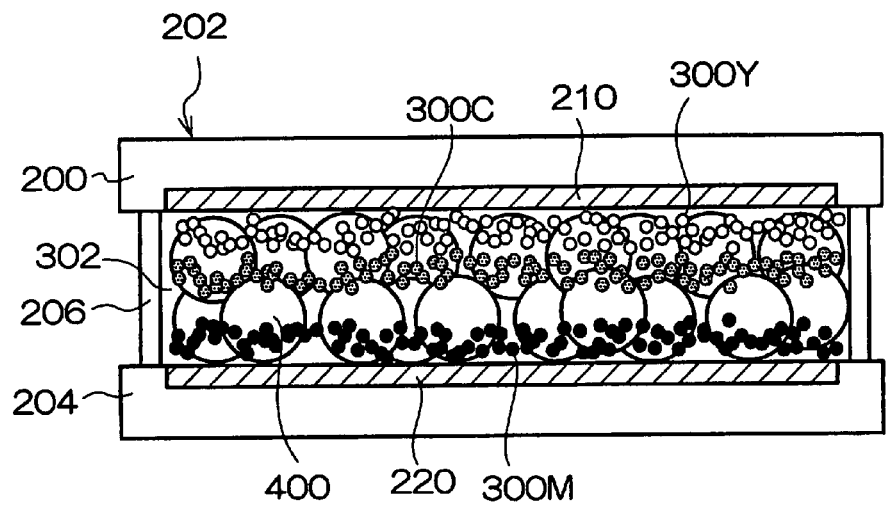
FIG. 20 is a schematic diagram showing another example of a display state in the display medium shown in FIG. 10.

Furthermore, when, from a display state shown in FIG. 19, a voltage equal to or higher than V1 but less than V2 is applied only for a time Th, the electrophoretic particles 300C move from the transparent substrate 200 side to the back substrate 204 side, and, at a time point when an electric field has been applied, are stuck and held on a surface of the electrophoretic particle holding particle 400 so as to be localized in the neighborhood of a center portion in a thickness direction of a light-modulating layer. Accordingly, a color density of a cyan color becomes thinner than a display state (green color) shown in FIG. 19 to display a yellow green color on a display surface 202 (FIG. 20).

In all display states shown in FIGS. 12 through 20, as far as an electric field is not applied newly, the electrophoretic particles 300C, 300M and 300Y continue to be stuck and held at same positions on the surface of the electrophoretic particle holding particle 400; accordingly, a display density after an electric field is removed is stably maintained over time.

In the same manner as in FIGS. 10 through 20, in the cases of a display medium 110, a display medium 110A and a display medium 110B shown in FIGS. 9, 21 and 22, a multi-color display can be carried out by use of plural kinds of electrophoretic particles 300C, 300M and 300Y.

The electrophoretic particle holder 410 filled and disposed inside of the display medium 110A and display medium 110B shown in FIGS. 21 and 22 are filled and disposed so that, as a distance from at least one of the substrate 202 and back substrate 204 increases in a direction in which substrates face each other, a function of holding the electrophoretic particles 300 becomes smaller; accordingly, when the same kind of the electrophoretic particles move between the substrate 202 and the back substrate 204, a moving speed when the electrophoretic particles move in a region larger in a function of holding the electrophoretic particles 300 of the electrophoretic particle holder 410 (electrophoretic particle holder 410A and electrophoretic particle holder 410C) becomes slower than a moving speed when the electrophoretic particles move in a region (electrophoretic particle holder 410B) smaller in the function of holding the electrophoretic particles 300 than the above region.

That is, when the electrophoretic particle holder 410 are filled and disposed so that, as a distance from at least one of the substrate 202 and the back substrate 204 increases in a direction in which the substrates face each other, the function of holding electrophoretic particles 300 may be smaller, the moving speed of the electrophoretic particles 300 in a region near a center between the substrate 202 and the back substrate 204 can be made higher than the moving speed of the electrophoretic particles 300 in a region close to at least one of the substrate 202 and the back substrate 204. Accordingly, at least in one of the substrate 202 and the back substrate 204, the electrophoretic particles 300 can be favorably held. Furthermore, when a function of holding the electrophoretic particles 300 on the electrophoretic particle holder 410 is varied in a direction in which the substrate 202 and the back substrate 204 face each other, gradation expression can be readily carried out.

EXAMPLES

In what follows, the exemplary embodiments will be described with reference to examples. However, the invention is not restricted to examples shown below.

<Preparation of Electrophoretic Particle A>

A mixture constituted of 90 parts by weight of styrene monomer and 1 part by weight of azoisobutyl nitrile is subjected to ball mill pulverization for 20 hr by use of zirconia ball of 10 mm φ, and thereby, a dispersion liquid A-1 is obtained.

A mixture constituted of 30 parts by weight of calcium carbonate and 70 parts by weight of water is subjected to an operation similar to the dispersion liquid A-1, and thereby, a dispersion liquid A-2 is obtained.

After 18 parts by weight of the dispersion liquid A-2 and 50 parts by weight of an aqueous solution of 20% sodium chloride are stirred and mixed, 30 parts by weight of the dispersion liquid A-1 is added to emulsify, and, thereby, an emulsion liquid A-3 is obtained.

The obtained emulsion liquid A-3 is heated at 70° C. under nitrogen gas flow, followed by stirring for 20 hr, and a solid particle A-4 is obtained. To the obtained solid particle A-4, 15 parts by weight of 35% hydrochloric acid is added and stirred to dissolve calcium carbonate, thereafter suction filtering and water washing are repeated 5 times, and a transparent particle A-5 is obtained.

The obtained transparent particle A-5 is mixed with methyl hydrogen silicone oil (trade name: KF-99, manufactured by Shin-Etsu Chemical Co., Ltd.), followed by stirring to apply hydrophobic treatment, thereby an electrophoretic particle A positively charged in silicone oil is obtained. An average particle diameter of the electrophoretic particles A is 1 µm.

<Preparation of Electrophoretic Particle B>

A mixture of 40 parts by weight of an ethylene-methacrylic acid copolymer (trade name: NEWCREL N699, manufactured by DUPONT Corp., copolymerization ratio (molar ratio) of ethylene/methacrylic acid=89/11), 8 parts by weight of a magenta pigment (trade name: CARMINE 6B, manufactured by Dainichiseika Color & Chemicals, Incorporated) and 2 parts by weight of a charge control agent (trade name: COPY CHARGE PSY VP2038, manufactured by Clariant Japan) are put in a stainless beaker, followed by stirring for 1 hr under heating at 120° C. by use of an oil bath, and thereby a melt body in which a resin, a pigment and a charge control agent are evenly contained is prepared. The obtained melt is gradually cooled to room temperature with stirring, followed by further adding 100 parts by weight of NORPAR 15 (trade name, manufactured by Exxon Corp.,).

As a system temperature goes down, mother particles that include the pigment and the charge control agent and have particle diameters in the range of 10 to 20 µm are precipitated. Then, 100 g of precipitated mother particles are put in a 01 type attritor and pulverized by use of steel balls having a diameter of 0.8 mm. The pulverization is continued, while a volume average particle diameter is monitored by use of a centrifugal sedimentation particle size distribution analyzer (trade name: SA-CP4L, manufactured by Shimadzu Corporation), until a particle diameter of 2.5 µm is obtained.

In the next place, 20 parts of the obtained concentrated particles (particle concentration 18% by weight) are diluted, so that a particle concentration may be 2% by weight with respect to a particle dispersion liquid, with 160 parts by weight of eicosane ($C_{20}H_{42}$, melting point: 36.8° C.) previously heated and melted at 75° C., followed by sufficient stirring.

The obtained particle dispersion liquid is repeatedly subjected 5 times to suction filtering/water washing, and thereby, magenta color electrophoretic particle B is obtained. An average particle diameter of the electrophoretic particles B is 1 µm and the charge polarity in silicone oil is positive polarity.

<Preparation of Electrophoretic Particle C>

-Preparation of Dispersion liquid A-

Cyclohexyl methacrylate: 53 parts by weight

Magenta pigment (trade name: Carmine 6B, manufactured by Dainichiseika Color & Chemicals Incorporated): 3 parts by weight Charge control agent (trade name: COPY CHARGE PSY VP2038, manufactured by Clariant Japan): 2 parts by weight A mixture of the above-described components is pulverized by use of a ball mill with zirconia balls having a diameter of 10 mm for 20 hr, and thereby a dispersion liquid A is prepared.

-Preparation of Dispersion liquid B-

Calcium carbonate: 40 parts by weight

Water: 60 parts by weight

A mixture of the above-described components is finely pulverized by use of a ball mill, and, thereby a dispersion liquid B is prepared.

-Preparation of Mixture Liquid C-
Aqueous solution of 2% by weight of Cellogen: 4.3 g
Dispersion liquid B: 8.5 g
Aqueous solution of 20% by weight of sodium chloride: 50 g The above-described components are mixed, followed by deaerating with an ultrasonic device for 10 min, further followed by stirring by use of an emulsifier, and thereby a mixture liquid C is prepared.

-Preparation of Particle-

At first, 35 g of the dispersion liquid A, 1 g of divinyl benzene and 0.35 g of a polymerization initiator AIBN (trade name, 2,2'-azobisisobutyronitrile) are sufficiently mixed and deaerated for 10 min by use of an ultrasonic device. This is put into a mixture liquid C, followed by emulsifying by use of an emulsifier.

In the next place, the obtained emulsified liquid is put in a bottle and sealed with a silicone cap, followed by, by use of a syringe needle, thoroughly depressurizing and deaerating, further followed by filling a nitrogen gas, still further followed by reacting at 60° C. for 10 hr to prepare particles. The obtained fine powder is dispersed in ion-exchanged water, followed by decomposing calcium carbonate with an aqueous solution of 1 N hydrochloric acid, further followed by filtering. Thereafter, the filtered product is washed with sufficient amount of distilled water, a particle diameter is regulated, followed by drying.

The obtained electrophoretic particle C has a magenta color and a volume average particle diameter of 1 μm. Furthermore, in silicone oil, the charging property is a positive polarity.

<Preparation of Electrophoretic Particle Holding Particle A>

A mixture constituted of 80 parts by weight of methyl methacrylate monomer, 17 parts by weight of titanium oxide (trade name: TAIPEKU CR63, manufactured by Ishihara Sangyo Kaisha, Ltd.) and 3 parts by weight of hollow particles (trade name: SX866 (A), manufactured by JSR Corp.) is pulverized for 20 hr by use of a ball mill with zirconia balls of 10 mmϕ, and thereby a dispersion liquid B-1 is obtained.

A mixture of 40 parts by weight of calcium carbonate and 60 parts by weight of water is operated similarly to the dispersion liquid B-1 and thereby a dispersion liquid B-2 is obtained.

Then, 8.5 parts by weight of the dispersion liquid B-2 and 50 parts by weight of an aqueous solution of 20% sodium chloride are stirred and mixed, and thereby a mixture liquid B-3 is obtained.

In the next place, 35 parts by weight of the dispersion liquid B-1, 1 part by weight of dimethacrylic acid ethylene glycol and 0.35 parts by weight of azoisobutylonitrile are mixed, followed by adding the mixture liquid B-3 to emulsify, and thereby an emulsified liquid B-4 is obtained.

Then, the obtained emulsified liquid B-4 is heated at 65° C. under nitrogen gas flow, followed by stirring for 15 hr, and thereby solid particles B-5 are obtained.

To the obtained solid particles B-5, 15 parts by weight of 35% hydrochloric acid are added, followed by stirring, further followed by, after calcium carbonate is dissolved, repeating suction filtering/water washing 5 times, and thereby white particles B-6 are obtained. The obtained white particles B-6 are sieved with a filter, and, thereby, white particles having an average particle diameter of 13 μm and charged negatively in silicone oil (electrophoretic particle holding particles A) are obtained.

<Preparation of Reflective Member A>

The white particles B-6 obtained when the electrophoretic particle holding particles A are prepared are further surface treated with a silane coupling agent γ-APS (trade name: KBM903, manufactured by Shin-Etsu Chemical Co., Ltd.) to control the charging properties, followed by, similarly to a case where the electrophoretic particle holding particles A are prepared, classifying with a filter, and thereby white particles having an average particle diameter of 13 μm and positively charged in silicone oil are obtained.

Example 1

A display medium having a configuration shown in FIG. 8 is prepared according to a procedure below.

In the beginning, on one surface of a transparent substrate constituted of 50 mm×50 mm and 0.7 mm thick glass, as a transparent electrode, an ITO film is formed at a thickness of 50 nm by a sputtering method.

On the other hand, on one surface of a back substrate constituted of 50 mm×50 mm and 0.7 mm thick alumina ceramics, as a back electrode, copper is formed at a film thickness of 500 nm by a sputtering method. Subsequently, on a surface of the back substrate at a side where the back electrode is disposed, an epoxy resin (trade name: SU-8, manufactured by MicroChem Corp.) is coated, followed by exposing and wet etching, and thereby a partition wall having a height of 100 μm and a width of 20μm is formed along an outer circumference of the back substrate.

Subsequently, on a top portion of the partition wall, a hot-melt type epoxy adhesive is coated and formed, followed by evenly filling the electrophoretic particle holding particles A in partitioned portions by a partition wall on the back substrate and by filling a dispersion liquid in which the electrophoretic particles A are dispersed in silicone oil (trade name: KF-96, manufactured by Shin-Etsu Chemical Corp.) (solid content: 3% by volume) up to a height of the partition wall.

Finally, a surface of the transparent substrate on which the transparent electrode is formed and the partition wall disposed on the back substrate are brought into close contact with each other so that air is not included in a gap between the transparent substrate and the back substrate, followed by adhering under heating, and thereby a display medium is prepared.

With thus prepared display medium, from a side of the display medium at which the transparent substrate is disposed, the display medium is observed to confirm whether or not a halftone can be displayed and whether or not it has the memory property.

In the beginning, a voltage of 20 V is applied to both electrodes so that a transparent electrode side of a display medium immediately after assembling may be minus until a display density of a display surface is sufficiently saturated. At this time, a deep red color is displayed on the display surface.

Subsequently, when, with a transparent electrode side set plus, while the voltage is gradually raised from 0 V, a voltage is applied to both electrodes for a sufficient time period at the respective voltage values, at voltages of 20 V or higher, the display density of the display surface varies from a deep red color to a complete white color (minimum density).

In the next place, after a deep red color (maximum density) is displayed on a display surface, an electric field is applied once at the minimum voltage value (5 V) where the display density of the display surface begins varying, and variations in the display density and display color at this time are confirmed. At this time, the evaluation is carried out while a time during which an electric field is applied is gradually shortened.

As the result, it is confirmed that, when an application time is 0.5 sec or less, the display density of the display surface after an electric field has been applied, without varying from a deep red color to a complete white color (minimum density), exhibits a thin red color and this state is maintained. From the above, it is found that the display medium can display a halftone and has (an absolute value of) a threshold voltage of 5 V and that, since an inter-electrode distance is 100μm, (an absolute value of) a threshold value of an electric field is 500 V/cm.

-Evaluation of Memory Property-

In the next place, the sustainability of the display state (memory property) is evaluated at three levels of the maximum density (deep red color), the minimum density (complete white color) and an intermediate density (thin red color).

When the memory property is evaluated, after a voltage is applied and a display state is set at the maximum density, the minimum density or the intermediate density, the voltage application is stopped, and the reflectance of the display surface at that time is obtained by use of X-Rite 404 (trade name, manufactured by X-Rite Corp.) and taken as an initial reflectance. Furthermore, the reflectance of the display surface after leaving for one day after the voltage application is stopped is measured as a reflectance after leaving and evaluated according to criteria below. Results are shown in Table 1.

The intermediate density is a display state when, from a state displaying the maximum density, with a transparent electrode side set plus, a voltage corresponding to the threshold voltage is applied for a predetermined time period (a half a time necessary for a display state to vary from the maximum density to the minimum density when an electric field is applied at a threshold voltage).

A: |100×reflectance after leaving/initial reflectance| is in the range of 98% or higher but 100% or lower.

B: |100×reflectance after leaving/initial reflectance| is in the range of 95% or higher but lower than 98%.

C: |100×reflectance after leaving/initial reflectance| is in the range of 85% or higher but lower than 95%.

D: |100×reflectance after leaving/initial reflectance| is less than 85%.

Example 2

Except that, in example 1, in place of a dispersion liquid where electrophoretic particles A are dispersed in silicone oil (trade name: KF-96, manufactured by Shin-Etsu Chemical Co., Ltd.), a dispersion liquid where electrophoretic particles B are dispersed in silicone oil (trade name: KF-96, manufactured by Shin-Etsu Chemical Co., Ltd.) is used, similarly to example 1, a display medium is prepared.

Subsequently, when, similarly to example 1, whether or not a halftone can be displayed is evaluated, it is confirmed that a halftone can be displayed.

Furthermore, it is found that (an absolute value of) a threshold voltage in the display medium of example 2 is 200 V and (an absolute value of) a threshold value of an electric field, since an inter-electrode distance is 100 μm, is 20 kV/cm. Still further, when an electric field is applied at a threshold voltage, a time necessary for the display state to vary from the maximum density to the minimum density is 0.2 sec. Furthermore, a result of evaluation of the memory property is shown in Table 1.

Example 3

Except that, in example 1, in place of a dispersion liquid where electrophoretic particles A are dispersed in silicone oil (trade name: KF-96, manufactured by Shin-Etsu Chemical Co., Ltd.), a dispersion liquid where electrophoretic particles C are dispersed in silicone oil (trade name: KF-96, manufactured by Shin-Etsu Chemical Co., Ltd.) is used, similarly to example 1, a display medium is prepared.

Subsequently, when, similarly to example 1, whether or not a halftone can be displayed is evaluated, it is confirmed that a halftone can be displayed.

Furthermore, it is found that (an absolute value of) a threshold voltage in the display medium of example 3 is 1 V and (an absolute value of) a threshold value of an electric field, since an inter-electrode distance is 100 μm, is 100 V/cm. Still further, when an electric field is applied at a threshold voltage, a time necessary for the display state to vary from the maximum density to the minimum density is 1 sec. Furthermore, a result of evaluation of the memory property is shown in Table 1.

Referential Example 1

Except that, in example 1, in place of the electrophoretic particle holding particles A, a reflective member A is used, similarly to example 1, a display medium is prepared.

Subsequently, when similarly to example 1 whether or not a halftone can be displayed is evaluated, it is confirmed that the halftone cannot be displayed. Furthermore, when the display states are the maximum density and the minimum density, similarly to example 1, the memory property is evaluated and results are shown in Table 1.

TABLE 1

|  | Constitution of Display Medium | Absolute Value of Threshold Value of Electric Field (V/cm) | Halftone Display | Memory Property | | |
| --- | --- | --- | --- | --- | --- | --- |
|  |  |  |  | Maximum Density | Intermediate Density | Minimum Density |
| Example 1 | FIG. 8 | 500 | Available | A | A | A |
| Example 2 | FIG. 8 | 20k | Available | A | A | A |
| Example 3 | FIG. 8 | 100 | Available | B | B | B |

TABLE 1-continued

| | Constitution of Display Medium | Absolute Value of Threshold Value of Electric Field (V/cm) | Halftone Display | Memory Property | | |
|---|---|---|---|---|---|---|
| | | | | Maximum Density | Intermediate Density | Minimum Density |
| Referential Example 1 | *1 | — | Non Available | C-D | — | C-D |

*1: In a display medium shown in FIG. 8, in place of electrophoretic particle holding particles, a reflective member is used.

Example 4

<Preparation of Electrophoretic Particle D>

As electrophoretic particles D, pigment base particles (content of coloring agent: 8% by weight, average particle diameter: 0.3 μm, magenta color) are prepared as shown below.

A mixture of 40 parts by weight of an ethylene/methacrylic acid copolymer (trade name: NEWCREL N699, manufactured by DUPONT Corp., copolymerization ratio (molar ratio) of ethylene/methacrylic acid=89/11), 8 parts by weight of a magenta pigment (trade name: CARMINE 6B, manufactured by Dainichiseika Color & Chemicals, Incorporated) and 2 parts by weight of a charge control agent (trade name: COPY CHARGE PSY VP2038, manufactured by Clariant Japan) is put in a stainless beaker, followed by stirring for 1 hr under heating at 120° C. by use of an oil bath, and thereby a melt where a resin, a pigment and a charge control agent are evenly contained is prepared. An obtained melt is gradually cooled to room temperature with stirring, followed by further adding 100 parts by weight of NORPAR 15 (trade name, manufactured by Exxon Corp.).

As a system temperature goes down, mother particles that include the pigment and the charge control agent and have a particle diameter in the range of 10 to 20μm are precipitated. Then, 100 g of the precipitated mother particles is put in a 01 type attritor and pulverized by use of steel balls having a diameter of 0.8 mm. The pulverization is continued, while a volume average particle diameter is monitored by use of a centrifugal sedimentation particle size distribution analyzer (trade name: SA-CP4L, manufactured by Shimadzu Corporation), until a particle diameter of 1.2 μm is obtained.

In the next place, 20 parts of the obtained concentrated particles (particle concentration: 18% by weight) are diluted, so that a particle concentration may be 2% by weight with respect to a particle dispersion liquid, with 160 parts by weight of eicosane ($C_{20}H_{42}$, melting point: 36.8° C.) previously heated and melted at 75° C., followed by thorough stirring.

The obtained particle dispersion liquid is repeatedly subjected 5 times to suction filtering/water washing, and thereby, magenta color electrophoretic particles D are obtained. An average particle diameter of the electrophoretic particles D is 0.3 μm and the charged polarity in silicone oil is positive polarity.

<Preparation of White Particle>

As white particles, polymer particles (content of titanium oxide (white-coloring agent): 40 to 70%, primary component: polymethyl acrylate, average particle diameter: 5 μm) are prepared as follows.

A mixture constituted of 80 parts by weight of methyl methacrylate monomer, 17 parts by weight of titanium oxide (trade name: TAIPEKU CR63, manufactured by Ishihara Sangyo Kaisha, Ltd.) and 3 parts by weight of hollow particles (trade name: SX866 (A), manufactured by JSR Corp.) is pulverized for 20 hr by use of a ball mill with zirconia balls of 10 mmφ, and thereby a dispersion liquid D-1 is obtained.

A mixture of 40 parts by weight of calcium carbonate and 60 parts by weight of water is operated similarly to the dispersion liquid D-1 and thereby a dispersion liquid D-2 is obtained.

Then, 8.5 parts by weight of the dispersion liquid D-2 and 50 parts by weight of an aqueous solution of 20% sodium chloride are stirred and mixed, and thereby a mixture liquid D-3 is obtained.

In the next place, 35 parts by weight of the dispersion liquid D-1, 1 part by weight of dimethacrylic acid ethylene glycol and 0.35 parts by weight of azoisobutylonitrile are mixed, followed by adding the mixture liquid D-3 to emulsify, and thereby an emulsified liquid D-4 is obtained.

Then, the obtained emulsified liquid D-4 is heated at 65° C. under nitrogen gas flow, followed by stirring for 15 hr, and thereby solid particles D-5 are obtained.

To the obtained solid particles D-5, 15 parts by weight of 35% hydrochloric acid are added, followed by stirring to dissolve calcium carbonate, further followed by repeating suction filtering/water washing 5 times, and thereby white particles D-6 are obtained. The obtained white particles D-6 are sieved with a filter, and, thereby, white particles having an average particle diameter of 5 μm and negatively charged in silicone oil (electrophoretic particle holding particles D) are obtained.

<Preparation of Electrophoretic Particle Holder D>

As an electrophoretic particle holder D, TORAYMICRON EM020 (trade name, manufactured by Toray Industries, Inc., weight: 20 g/m², thickness: 150 μm) that is an electret-type non-woven fabric is prepared.

A display medium having a configuration shown in FIG. 9 is prepared according to a procedure below.

In the beginning, on one surface of a transparent substrate constituted of 50 mm×50 mm glass having a thickness of 0.7 mm, as a transparent electrode, an ITO film is formed at a thickness of 50 nm by a sputtering method.

On the other hand, on one surface of a back substrate constituted of 50 mm×50 mm alumina ceramics having a thickness of 0.7 mm, as a back electrode, copper is formed at a film thickness of 500 nm by a sputtering method. Subsequently, a region of 1 cm² on a surface of the back substrate at a side where the back electrode is disposed is partitioned with a polyimide tape (trade name: No. 360, produced by Nitto Denko Co., Ltd.) and thereby a gap having a height of 120 μm is formed.

Subsequently, on a top portion of the polyimide tape, a hot-melt type epoxy adhesive is coated and formed, followed by cutting TORAYMICRON EM020 into 1 cm² and disposing as the electrophoretic particle holder D in a region partitioned by a partition wall on the back substrate.

When, on the disposed TORAYMICRON EM020 (hereinafter, referred to as EM020), 60 µl of a dispersion liquid in which the above-prepared electrophoretic particle D and white particle, respectively, are dispersed at a content of 8% by weight and a content of 5% by weight in silicone oil (KF-96, manufactured by Shin-Etsu Chemical Co., Ltd.) is added dropwise, the dispersion liquid evenly spreads over the EM020.

Finally, a surface of the transparent substrate at which the transparent electrode is formed and the partition wall disposed on the back substrate are brought into close contact with each other so that air may not come into a gap between the transparent substrate and the back substrate, followed by sealing a circumference with a UV-curable resin (trade name: 3003, manufactured by ThreeBond Co., Ltd.), and thereby a display medium is prepared.

With thus prepared display medium, from a side of the display medium at which the transparent substrate is disposed, the display medium is observed to confirm whether or not a halftone can be displayed and whether or not it has the memory property similarly as in example 1.

In the beginning, a voltage is applied to both electrodes so that a transparent electrode side of a display medium immediately after assembling may be plus for 10 sec at each of voltage values with the voltage being raised stepwise by 20 V from 0 V. The voltage is applied until the display density of the display surface is sufficiently saturated at the application of a voltage of the respective voltage values. At this time, when a state of white particles adhered to the EM020 immediately after application of a voltage of each of values for 10 sec is observed with a microscope (trade name: VHX DEGITAL MICROSCOPE, manufactured by Keyence Corporation, magnification: 500 times), it is confirmed that, immediately after application of a voltage of 100 V or lower, white particles are stuck same as an initial state to a surface of fibers of EM020 disposed in the display medium and white particles adhered to a region within 20 µm from the transparent electrode do not increase even when a voltage is applied. Furthermore, it is confirmed that, immediately after a voltage of 200 V or higher is applied, almost all of the white particles in the display medium are stuck to a region of EM020 within 20 µm from the transparent electrode. This is considered that a force of moving white particles due to application of a voltage is larger than a magnitude of an interaction between a white particle and the fiber constituting EM020.

In the next place, with a transparent electrode side set minus, a voltage of −300 V is applied to both electrodes for 20 sec to display a deep red color (maximum density) on a display surface, and then, an electric field is once applied at the minimum voltage value (250 V) where the display density of the display surface starts varying, and the variations in the display density and display color at this time are confirmed. At this time, while a time during which an electric field is applied is gradually shortened, the evaluation is carried out.

As a result, it is confirmed that, when an application time is 3 sec or less, a display density of a display surface after an electric field has been applied, without changing from a deep red color to a complete white color (minimum density), exhibits a thin red color and the state is maintained. From this, it is found that the display medium can display a halftone, (an absolute value of) a threshold voltage of the electrophoretic particles D that are magenta particles is 250 V and (an absolute value of) a threshold value of an electric field, since an inter-electrode distance is 120 µm, is 21 kV/cm.

-Evaluation of Memory Property-

In the next place, when, similarly to example 1, whether or not the halftone can be displayed is evaluated, it is confirmed that the halftone can be displayed.

In example 4, a threshold voltage of the electrophoretic particles D filled in the display medium is 250 V and a threshold voltage of the white particles is 180 V. Accordingly, it is found that (absolute values of) threshold values of electric fields, since an inter-electrode distance is 120 µm, are 21 kV/cm and 15 kV/cm, respectively. Furthermore, when electric fields are applied at the respective threshold voltages, times necessary for a display state to change from the maximum density to the minimum density are 5 sec and 8 sec, respectively.

Threshold voltages of the respective electrophoretic particles D and white particles are measured by preparing and measuring display media of the respective configurations of a configuration containing the electrophoretic particles D and the white particles and a configuration containing the white particles but not containing the electrophoretic particles D in the display media prepared in example 4. Results of evaluation of the memory property are shown in Table 2.

Example 5

<Preparation of Electrophoretic Particle E>

As electrophoretic particles E, polymer particles (content of coloring agent: 20% by weight, average particle diameter: 5 µm, magenta color) are prepared as shown below.

A mixture constituted of 80 parts by weight of methyl methacrylate monomer, 5 parts by weight of a magenta pigment (trade name: CARMINE 6B, manufactured by Dainichiseika Color & Chemicals, Incorporated) and 3 parts by weight of hollow particle (trade name: SX866 (A), manufactured by JSR Corp.) is subjected to ball mill pulverization with zirconia balls of 10 mmφ for 20 hr, and thereby a dispersion liquid E-1 is obtained.

A mixture of 40 parts by weight of calcium carbonate and 60 parts by weight of water is operated similarly to the dispersion liquid E-1 and thereby a dispersion liquid E-2 is obtained.

Then, 8.5 parts by weight of the dispersion liquid E-2 and 50 parts by weight of an aqueous solution of 20% sodium chloride are stirred and mixed, and thereby a mixture liquid E-3 is obtained.

In the next place, 35 parts by weight of the dispersion liquid E-1, 1 part by weight of dimethacrylic acid ethylene glycol and 0.35 parts by weight of azoisobutyl nitrile are mixed, followed by adding the mixture liquid E-3 to emulsify, and thereby an emulsified liquid E-4 is obtained.

Then, the obtained emulsified liquid E-4 is heated at 65° C. under nitrogen gas flow, followed by stirring for 15 hr, and thereby solid particles E-5 are obtained.

To the obtained solid particles E-5, 15 parts by weight of 35% hydrochloric acid are added, followed by stirring to dissolve calcium carbonate, further followed by repeating suction filtering/water washing 5 times, and thereby particles E-6 are obtained. The obtained particles E-6 are sieved with a filter, and, thereby, magenta color particles having an average particle diameter of 5µm and charged negative in silicone oil (electrophoretic particle holding particles E) are obtained.

<Preparation of Electrophoretic Particle F>

As electrophoretic particles F, polymer particles (content of coloring agent: 20% by weight, average particle diameter: 13 μm, cyan color) are prepared as shown below.

A mixture constituted of 80 parts by weight of methyl methacrylate monomer, 5 parts by weight of a cyan pigment (trade name: COPPER PHTHALLOCYANINE BLUE, manufactured by Dainichiseika Color & Chemicals, Incorporated) and 3 parts by weight of hollow particles (trade name: SX866 (A), manufactured by JSR Corp.) is subjected to ball mill pulverization with zirconia balls of 10 mmϕ for 20 hr, and thereby a dispersion liquid F-1 is obtained.

A mixture of 40 parts by weight of calcium carbonate and 60 parts by weight of water is operated similarly to the dispersion liquid F-1 and thereby a dispersion liquid F-2 is obtained.

Then, 8.5 parts by weight of the dispersion liquid F-2 and 50 parts by weight of an aqueous solution of 20% sodium chloride are stirred and mixed, and thereby a mixture liquid F-3 is obtained.

In the next place, 35 parts by weight of the dispersion liquid F-1, 1 part by weight of dimethacrylic acid ethylene glycol and 0.35 parts by weight of azoisobutyl nitrile are mixed, followed by adding the mixture liquid F-3 to emulsify, and thereby an emulsified liquid F-4 is obtained.

Then, the obtained emulsified liquid F-4 is heated at 65° C. under nitrogen gas flow, followed by stirring for 15 hr, and thereby solid particles F-5 are obtained.

To the obtained solid particles F-5, 15 parts by weight of 35% hydrochloric acid are added, followed by stirring to dissolve calcium carbonate, further followed by repeating suction filtering/water washing 5 times, and thereby particles F-6 are obtained. The obtained particles F-6 are sieved with a filter, and, thereby, cyan colored particles having an average particle diameter of 13 μm and charged negatively in silicone oil (electrophoretic particle holding particles F) are obtained.

Using the above-prepared electrophoretic particles E and F as the electrophoretic particles, and using TORAYMICRON EM020 used in the example 4 as an electrophoretic particle holder, a display medium is prepared similarly to example 4.

The electrophoretic particles E and the electrophoretic particles F, respectively, are dispersed in silicone oil (trade name: KF-96, manufactured by Shin-Etsu Chemical Co., Ltd.) at a content of 5% by weight and a content of 5% by weight to prepare a dispersion liquid and 60 μl of the dispersion liquid is added dropwise to EM020 similarly to example 4.

With the thus prepared display medium, similarly to example 4, from a side of the display medium at which the transparent substrate is disposed, the display medium is observed to confirm whether or not a halftone can be displayed and whether or not it has the memory property.

In the beginning, a voltage is applied to both electrodes so that a transparent electrode side of a display medium immediately after assembling may be plus for 20 sec at each of voltage values with the voltage being raised stepwise by 20 V from 0 V. When, in this state, a voltage is applied at each of the voltage values until a display density of a display surface is saturated, the electrophoretic particles E and electrophoretic particles F, respectively, are observed to move toward a display surface side (transparent electrode side). At this time, when states of the electrophoretic particles E and the electrophoretic particles F adhered to the EM020 immediately after application of a voltage at each of values for 20 sec are observed with a microscope (trade name: VHX DIGITAL MICROSCOPE, manufactured by Keyence Corporation, magnification: 500 times), immediately after application of a voltage of 50 to 150 V, the electrophoretic particles F (average particle diameter: 13 μm, cyan color) are confirmed to be stuck in a region within 20 μm from a transparent electrode of EM020 disposed in the display medium and a display surface of the display medium has a cyan color.

Furthermore, it is confirmed that, immediately after a voltage of 200 V or higher is applied, almost all of the electrophoretic particles F and electrophoretic particles E (average particle diameter: 5 μm, magenta color) are stuck in a region within 20 μm from the transparent electrode of the EM020 disposed in the display medium, and a display surface of the display medium has a violet color.

In the next place, when a voltage of 100 V is applied to both electrodes for 20 sec with a transparent electrode side set minus, the electrophoretic particles F move toward a back substrate side to display a deep red color (magenta color) (maximum density). Even after a voltage application is stopped, a color of the display surface does not show a remarkable change.

From this, it can be said that owing to a display medium of example 5 that contains the electrophoretic particles E and the electrophoretic particles F, which are different from each other in an absolute value of a threshold value of an electric field, a display medium capable of a color display can be provided. The difference in an absolute value of a threshold value of an electric field is considered to be derived from the difference between an electrostatic interaction between the electrophoretic particles F and fibers that constitute the EM020 and an electrostatic interaction between the electrophoretic particles E and fibers that constitute the EM020. It is considered that, although the electrophoretic particles F having an average particle diameter of 13 μm are larger in an absolute value of a charge amount than that of the electrophoretic particles E having an average particle diameter of 5 μm, an average distance from a fiber that constitutes the EM020 is larger; accordingly, the electrophoretic particles F is smaller in a force held by the EM020 than the electrophoretic particles E, but a moving force owing to an electric field formed between the substrates increases in proportion to a charge amount, and thus an absolute value of the threshold value of the electric field of the electrophoretic particles F is smaller than that of the electrophoretic particle E.

In the next place, after a deep red color (magenta color) is displayed as the maximum density on the display surface, a voltage is applied between both electrodes with the transparent electrode side set minus and gradually raised. An electric field is applied once at the smallest voltage value (180 V) where the display density of a display surface begins varying, and variations in a display density and a display color at this time are confirmed. At this time, while an electric field applying time is gradually shortened, evaluation is carried out.

As a result, it is confirmed that, when an application time is 5 sec or less, the display density of the display surface after an electric field has been applied, without varying from a deep red color to a complete white color (minimum density), exhibits a thin red color and this state is maintained. From the above, it is found that the display medium can display a halftone and has (an absolute value of) a threshold voltage of the electrophoretic particles E that are magenta colored particles of 180 V and, since an inter-electrode distance is 120 μm, (an absolute value of) a threshold value of an electric field of 15 kV/cm. Furthermore, since (an absolute value of) a threshold voltage of the cyan electrophoretic particles F is 80 V and an inter-electrode distance is 120 μm, (an absolute value of) a threshold value of an electric field is found to be 7 kV/cm.

-Evaluation of Memory Property-

Subsequently, when, similarly to example 1, whether or not a halftone can be displayed is evaluated, it is confirmed that a halftone can be displayed.

In example 5, among the electrophoretic particles E (magenta color) and the electrophoretic particles F (cyan color) that are filled in a display medium, with a state where only the magenta electrophoretic particles E are present at a display surface side being taken as the maximum density and a state where all of the electrophoretic particles E and F move toward the back substrate side being taken as the minimum density, the memory property is evaluated. A result of evaluation of the memory property is shown in Table 2.

Example 6

Using the electrophoretic particles E and F prepared in example 5 as the electrophoretic particles, and using ELTASAQUA PA3023 (trade name, produced by ASAHI KASEI FIBERS Corporation, weight: 23 g/m², thickness: 200 μm) in place of TORAYMICRON EM020 used in the example 5, similarly to example 5, a display medium is prepared.

A height of a partition wall of the display medium is set to 200 μm in accordance with a thickness of the ELTASAQUA PA3023.

Using the thus prepared display medium, similarly to example 6, the display medium is observed from a side of the display medium at which a transparent substrate is disposed to confirm whether or not a halftone can be displayed and whether or not it has the memory property.

In the beginning, a voltage is applied to both electrodes so that a transparent electrode side of a display medium immediately after assembling may be plus for 10 sec at each of voltage values with the voltage being raised stepwise by 10 V from 0 V. When, in this state, a voltage is applied at each of the voltage values until a display density of a display surface is sufficiently saturated, the electrophoretic particles E and electrophoretic particles F, respectively, are observed to move toward a display surface side (transparent electrode side). At this time, when states of the electrophoretic particles E and the electrophoretic particles F adhered to the EM020 immediately after application of a voltage at each of values for 10 sec are observed with a microscope (trade name: VHX DIGITAL MICROSCOPE, manufactured by Keyence Corporation, magnification: 500 times), immediately after application of a voltage of 10 to 50 V, the electrophoretic particles E (average particle diameter: 5 μm, magenta color) are confirmed to be stuck in a region within 20 μm from a transparent electrode of EM020 disposed in the display medium and a display surface of the display medium has a magenta color.

Furthermore, it is confirmed that, immediately after a voltage of 100 V or higher is applied, almost all of the electrophoretic particles E and electrophoretic particles F (average particle diameter: 13 μm, cyan color) are stuck in a region within 20 μm from the transparent electrode of the EM020 disposed in the display medium, and a display surface of the display medium has a violet color.

Thus, when, contrary to example 4, an applied voltage is gradually raised, it is observed that, among the electrophoretic particles E and F, the electrophoretic particles E firstly move toward the display surface side. When the voltage application time at each of voltages in the range of 10 to 50 V is lengthened (30 sec) more than the above, both of the electrophoretic particles E and F move toward the display surface side.

This shows that the electrophoresis of the electrophoretic particles is affected by a distance between fibers that constitute an electrophoretic particle holder and a particle diameter of the electrophoretic particles held by the electrophoretic particle holder. That is, it is considered that, relative to a distance between fibers that constitute ELTASAQUA PA3023 as the electrophoretic particle holder, an average particle diameter of the electrophoretic particles E (average particle diameter: 5 μm) is smaller than an average particle diameter of the electrophoretic particle F (average particle diameter: 13 μm); accordingly, the electrophoretic particles E can sufficiently move within the electrophoretic particle holder but the electrophoretic particles F are suppressed in the electrophoresis in the electrophoretic particle holder.

A charge amount-of the ELTASAQUA PA3023 that is used as the electrophoretic particle holder in example 6 is so small as not to affect on the electrophoresis of the electrophoretic particle. Accordingly, in the case of example 6, it is considered that a charge amount of the electrophoretic particle holder (ELTASAQUA PA3023) affects on the electrophoresis of the electrophoretic particles only slightly.

The adherence states of the electrophoretic particles E and F to the electrophoretic particle holder in example 6 (ELTASAQUA PA3023) are smaller than that to the electrophoretic particle holder in example 5 (TORAYMICRON EM020); accordingly, a situation of being relatively freely electrophoresed between fibers can be observed. Furthermore, the sustainability of a color showed on a display surface after a voltage is applied in example 6 is inferior to that of example 5.

In the next place, a voltage of 50 V is applied to both electrodes for 10 sec so that a transparent electrode side may be plus and thereby only magenta color electrophoretic particles E of the electrophoretic particles F and E are moved toward the display substrate side to display a deep red color (magenta color) (maximum density) on a display surface. Even after a voltage application is stopped, a color on the display surface does not remarkably vary.

In the next place, a voltage is applied to both electrodes so that a transparent electrode side may be minus and gradually raised, an electric field is only once applied at the smallest voltage value (35 V) where a display density of a display surface starts varying, and variations in the display density and display color at this time are confirmed. At this time, with a time during which an electric field is applied being gradually shortened, the evaluation is carried out.

As the result thereof, it is confirmed that, when an application time is 7 sec or less, a display density of the display surface after an electric field has been applied, without varying from a deep red to a complete white (minimum density), shows a thin red color and this state can be sustained. From this, it is found that the display medium can display a halftone, (an absolute value of) a threshold voltage of the electrophoretic particles E that are magenta particles is 35 V and (an absolute value of) a threshold value of an electric field, since an inter-electrode distance is 200 μm, is 1700 V/cm. Furthermore, it is found that (an absolute value of) a threshold voltage of the electrophoretic particles F that are cyan particles is 50 V and (an absolute value of) a threshold value of an electric field, since an inter-electrode distance is 200 μm, is 2500 V/cm.

-Evaluation of Memory Property-

Subsequently, when, similarly to example 1, whether or not a halftone can be displayed is evaluated, it is confirmed that a halftone can be displayed.

In example 6, among the electrophoretic particles E (magenta color) and the electrophoretic particles F (cyan color), which are filled in a display medium, with a state where only the magenta electrophoretic particles E are present at a display surface side being taken as the maximum density and a state where all of the electrophoretic particles E and F move toward the back substrate side being taken as the minimum density, the memory property is evaluated. A result of evaluation of the memory property is shown in Table 2.

Example 7

<Preparation of Electrophoretic Particle Holder>

The ELTASAQUA PA3023, after leaving for 3 sec on a hot plate (trade name: HI-1000, manufactured by As-one Corp.) of which plate temperature is set at 180° C., is peeled off from the hot plate and left to natural cooling.

When a surface of the thus heat treated ELTASAQUA PA3023 (hereinafter, referred to as PA3023) is confirmed with a microscope (trade name: VHX DIGITAL MICROSCOPE, manufactured by Keyence Corporation, magnification: 250 times), it is confirmed that fibers in the proximity of a surface of the PA3023 are slightly dissolved and entangled each other to be denser in the inter-fiber distance in comparison with a region that is not heat treated.

Using the heat-treated PA3023 as the electrophoretic particle holder and using the electrophoretic particles E and F prepared in example 5 as the electrophoretic particle, by a method similar to example 6, a display medium is prepared.

When a display medium is prepared, the PA 3023 is disposed so that a surface of the heat treated PA3023 at a heat-treated side may come into contact with an electrode (transparent electrode) at a display surface side and thereby a display medium shown in FIG. 21 is prepared.

Subsequently, when, similarly to example 6, whether or not a halftone can be displayed is evaluated, it is conformed that the halftone can be displayed.

In the display medium of example 7, it is found that (an absolute value of) a threshold voltage of the electrophoretic particles E that are magenta particles is 45 V and (an absolute value of) a threshold value of an electric field, since an inter-electrode distance is 200 μm, is 2200 V/cm. Furthermore, it is found that (an absolute value of) a threshold voltage of the electrophoretic particles F that are cyan particles is 60 V and a (absolute value) of a threshold value of an electric field is, since an inter-electrode distance is 200 μm, 3000 V/cm. Still further, when an electric field is applied at the threshold voltage, a time necessary for the display state to vary from the maximum density to minimum density is 12 sec. An evaluation result of the memory property is shown in Table 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium, comprising at least:
    a pair of substrates, at least one of the substrates having optical transparency;
    a dispersion medium positioned in a gap between the pair of substrates;
    one or more kinds of electrophoretic particles or two or more kinds of electrophoretic particles different in color from each other, charged with a positive or negative polarity and included in the dispersion medium; and
    a holder disposed between the pair of substrates and at least partially charged with a polarity opposite to that of all the kinds of the electrophoretic particles, the holder having a function of holding the electrophoretic particles.

2. The display medium of claim 1, wherein an absolute value of a threshold value of an electric field at which the electrophoretic particles in a state of being held by the holder are detached from the holder and moved in the dispersion medium is in the range of about 100 V/cm to about 30 kV/cm.

3. The display medium of claim 1, wherein the holder further comprises at least two particulate members.

4. The display medium of claim 1, wherein the holder has a color different from that of all the kinds of the electrophoretic particles.

5. The display medium of claim 1, wherein the holder further comprises an aggregate of fibers.

6. The display medium of claim 1, wherein the holder further comprises a non-woven fabric.

TABLE 2

| | Constitution of Display Medium | Absolute Value of Threshold Value of Electric Field (V/cm) | Halftone Display | Memory Property | | |
|---|---|---|---|---|---|---|
| | | | | Maximum Density | Intermediate Density | Minimum Density |
| Example 4 | FIG. 9 | 21k | Available | A | A | A |
| Example 5 | FIG. 9 | 15k | Available | B | B | B |
| Example 6 | FIG. 9 | 1700 | Available | C | C-D | C |
| Example 7 | FIG. 21 | 2200 | Available | B-C | C | C |

7. The display medium of claim 1, wherein the function of holding the electrophoretic particles of the holder varies continuously or stepwise in a direction in which the pair of substrates face each other.

8. The display medium of claim 1, wherein the function of holding the electrophoretic particles of the holder decreases continuously or stepwise as a distance from at least one of the pair of substrates increases in a direction in which the pair of substrates face each other.

9. The display medium of claim 1, wherein the holder further comprises a porous body having gaps through which the electrophoretic particles pass.

10. The display medium of claim 1, wherein the holder has a white color.

11. The display medium of claim 1, wherein the electrophoretic particles further comprises at least two kinds of electrophoretic particles different from each other in color and in an absolute value of a threshold value of an electric field at which the electrophoretic particles are detached from the holder and moved in the dispersion medium.

12. The display medium of claim 1, wherein the electrophoretic particles further comprises at least two kinds of electrophoretic particles different from each other in a volume average primary particle diameter.

13. The display medium of claim 1, wherein the electrophoretic particles further comprises at least two kinds of electrophoretic particles different from each other in a color formed in a state of being dispersed in the dispersion medium and in an absolute value of a threshold value of an electric field at which the electrophoretic particles are detached from the holder and moved in the dispersion medium.

14. The display medium of claim 1, wherein the electrophoretic particles are moved, by an external voltage, at least from a state of being held in an arbitrary region on a surface of the holder to another region on a surface of the holder.

15. A display device, comprising at least:
a pair of substrates, at least one of the substrates having optical transparency;
a dispersion medium positioned in a gap between the pair of substrates;
one or more kinds of electrophoretic particles or two or more kinds of electrophoretic particles different in color from each other, charged with a positive or negative polarity and included in the dispersion medium;
a light-modulating layer disposed between the pair of substrates and including a holder at least partially charged with a polarity opposite to that of all the kinds of the electrophoretic particles, the holder having a function of holding the electrophoretic particles;
a pair of electrodes respectively disposed on one substrate side and the other substrate side of the pair of substrates; and
an electric field applicator that is connected to the pair of electrodes and applies an electric field to the dispersion medium.

16. The display device of claim 15, wherein
an absolute value of a threshold value of an electric field at which the electrophoretic particles in a state of being held by the holder are detached from the holder and moved in the dispersion medium is in the range of about 100 V/cm to about 30 kV/cm;
the electric field applicator applies, to the dispersion medium, an electric field having a voltage waveform having cycles each including a first interval where an electric field is continuously applied at a voltage where an absolute value of the voltage is equal to or higher than an absolute value of a threshold voltage corresponding to the threshold value of the electric field and a second interval where an electric field is continuously applied at a voltage where an absolute value of the voltage is less than an absolute value of a threshold voltage corresponding to the threshold value of the electric field; and
in the first interval in at least any one of the cycles, the following formula (1) is satisfied:

$$Ep < Emax \qquad \text{Formula (1)}$$

wherein Ep denotes a value represented by the following formula (2), and Emax denotes a product of voltage·time (V·s) necessary for varying a display density from the maximum density to the minimum density or from the minimum density to the maximum density when an electric field is continuously applied to the light-modulating layer at a voltage where an absolute value of the voltage is equal to or higher than the absolute value of the threshold voltage $$E_p = \int_0^{t_p} V(t)\,dt \qquad \text{Formula (2)}$$

wherein t denotes any time (s) within the first interval in the at least any one of the cycles, tp denotes a time (s) from a start to an end of the first interval in the at least any one of the cycles, and V(t) denotes a voltage (V) at the time t.

17. The display device of claim 15, wherein the holder further comprises at least two particulate members.

18. The display device of claim 15, wherein the holder has a color different from that of all the kinds of the electrophoretic particles.

19. The display device of claim 15, wherein the holder further comprises an aggregate of fibers.

20. The display device of claim 15, wherein the holder further comprises a non-woven fabric.

21. The display device of claim 15, wherein the function of holding the electrophoretic particles of the holder varies continuously or stepwise in a direction in which the pair of substrates face each other.

22. The display device of claim 15, wherein the function of holding the electrophoretic particles of the holder decreases continuously or stepwise as a distance from at least one of the pair of substrates increases in a direction in which the pair of substrates face each other.

23. The display device of claim 15, wherein the holder further comprises a porous body having gaps through which the electrophoretic particles pass.

24. The display device of claim 15, wherein the holder has a white color.

25. The display device of claim 15, wherein the electrophoretic particles further comprises at least two kinds of electrophoretic particles different from each other in color and in an absolute value of a threshold value of an electric field at which the electrophoretic particles are detached from the holder and moved in the dispersion medium.

26. The display device of claim 15, wherein the electrophoretic particles further comprises at least two kinds of electrophoretic particles different from each other in a volume average primary particle diameter.

27. The display device of claim 15, wherein the electrophoretic particles further comprises at least two kinds of electrophoretic particles different from each other in a color formed in a state of being dispersed in the dispersion medium and in an absolute value of a threshold value of an electric field at which the electrophoretic particles are detached from the holder and moved in the dispersion medium.

28. The display device of claim 15, wherein the electrophoretic particles are moved, by an electric field applied by the electric field applicator, at least from a state of being held in an arbitrary region on a surface of the holder to another region on a surface of the holder.

29. A display method of switching a display by carrying out the following processes in any order, the method comprising:

applying an electric field to a light-modulating layer that includes a dispersion medium, at least one kind of electrophoretic particles or at least two kinds of electrophoretic particles different in color from each other, included in the dispersion medium, and a holder having a function of holding the electrophoretic particles, the electric field forming a potential gradient and moving the electrophoretic particles via the holder, to localize the electrophoretic particles at one side of the light-modulating layer, thereby displaying a color due to the electrophoretic particles at the one side of the light-modulating layer at a maximum density;

applying an electric field to the light-modulating layer, the electric field forming a potential gradient and moving the electrophoretic particles via the holder, to localize the electrophoretic particles at the other side of the light-modulating layer, thereby displaying a color due to the electrophoretic particles at the one side of the light-modulating layer at a minimum density; and applying an electric field to the light-modulating layer, the electric field forming a potential gradient and moving the electrophoretic particles via the holder, to localize the electrophoretic particles between the one side and the other side of the light-modulating layer, thereby displaying a color due to the electrophoretic particles at the one side of the light-modulating layer at a density smaller than the maximum density but larger than the minimum density.

30. The display method of claim 29, wherein an absolute value of a threshold value of an electric field at which the electrophoretic particles in a state of being held by the holder are detached from the holder and moved in the dispersion medium is in the range of about 100 V/cm to about 30 kV/cm.

31. The display method of claim 29, wherein a voltage waveform of the electric field applied to the light-modulating layer has cycles each including a first interval where an electric field is continuously applied at a voltage where an absolute value of the voltage is equal to or higher than an absolute value of a threshold voltage corresponding to a threshold value of an electric field at which the electrophoretic particles in a state of being held by the holder are detached from the holder and moved in the dispersion medium, and a second interval where an electric field is continuously applied at a voltage where an absolute value of the voltage is less than an absolute value of a threshold voltage corresponding to the threshold value of the electric field, in the first interval in at least any one of the cycles, the following formula (3) being satisfied:

$$Ep < Emax \qquad \text{Formula (3)}$$

wherein Ep denotes a value represented by the following formula (4), and Emax denotes a product of voltage·time (V·s) necessary for varying a display density from the maximum density to the minimum density or from the minimum density to the maximum density when an electric field is continuously applied to the light-modulating layer at a voltage where an absolute value of the voltage is equal to or higher than the absolute value of the threshold voltage $$E_p = \int_0^{t_p} V(t)\,dt \qquad \text{Formula (4)}$$

wherein t denotes any time (s) within the first interval in the at least any one of the cycles, tp denotes a time (s) from a start to an end of the first interval in the at least any one of the cycles, and V(t) denotes a voltage (V) at the time t.

32. A display medium, comprising at least:

a pair of substrates, at least one of the substrates having optical transparency;

a dispersion medium positioned in a gap between the pair of substrates;

at least one kind of electrophoretic particles or at least two kinds of electrophoretic particles different in color from each other, included in the dispersion medium; and a holder disposed between the pair of substrates, the holder including a non-woven fabric and having a function of holding the electrophoretic particles.

33. The display medium of claim 32, wherein the function of holding the electrophoretic particles of the holder varies continuously or stepwise in a direction in which the pair of substrates face each other.

34. The display medium of claim 32, wherein the function of holding the electrophoretic particles of the holder decreases continuously or stepwise as a distance from at least one of the pair of substrates increases in a direction in which the pair of substrates face each other.

35. The display medium of claim 32, wherein the electrophoretic particles are moved by, an external voltage, at least from a state of being held in an arbitrary region on a surface of the holder to another region on a surface of the holder.

36. A display device, comprising at least:

a pair of substrates, at least one of the substrates having optical transparency;

a dispersion medium positioned in a gap between the pair of substrates;

at least one kind of electrophoretic particles or at least two kinds of electrophoretic particles different in color from each other, included in the dispersion medium;

a light-modulating layer disposed between the pair of substrates and including a holder including a non-woven fabric, the holder having a function of holding the electrophoretic particles;

a pair of electrodes respectively disposed on one substrate side and the other substrate side of the pair of substrates; and an electric field applicator that is connected to the pair of electrodes and applies an electric field to the dispersion medium.

37. The display device of claim 36, wherein the function of holding the electrophoretic particles of the holder varies continuously or stepwise in a direction in which the pair of substrates face each other.

38. The display device of claim 36, wherein the function of holding the electrophoretic particles of the holder decreases continuously or stepwise as a distance from at least one of the pair of substrates increases in a direction in which the pair of substrates face each other.

39. The display device of claim 36, wherein the electrophoretic particles are moved, by an electric field applied by the electric field applicator, from a state of being held on an arbitrary region on a surface of the holder to another region on a surface of the holder.

\* \* \* \* \*